US012572235B2

(12) United States Patent
Lee

(10) Patent No.: US 12,572,235 B2
(45) Date of Patent: Mar. 10, 2026

(54) ELECTRONIC DEVICE HAVING A SENSOR LAYER WITH A VARIABLE REPORT INTERVAL

(71) Applicant: SAMSUNG DISPLAY CO., LTD., Yongin-si (KR)

(72) Inventor: Soongyu Lee, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 682 days.

(21) Appl. No.: 17/820,149

(22) Filed: Aug. 16, 2022

(65) Prior Publication Data

US 2023/0185401 A1 Jun. 15, 2023

(30) Foreign Application Priority Data

Dec. 13, 2021 (KR) .......................... 10-2021-0178084

(51) Int. Cl.
*G06F 3/041* (2006.01)

(52) U.S. Cl.
CPC ...... *G06F 3/04166* (2019.05); *G06F 3/04184* (2019.05)

(58) Field of Classification Search
None
See application file for complete search history.

(56) References Cited

U.S. PATENT DOCUMENTS 8,884,917 B2 11/2014 Seo
9,612,704 B2 4/2017 Nam et al.

| 10,338,711 B2 * | 7/2019 | Kim | ...................... G06F 3/0443 |
| 10,572,055 B2 | 2/2020 | Shin | |
| 10,739,884 B2 | 8/2020 | Ota et al. | |
| 2015/0035768 A1 | 2/2015 | Shahparnia et al. | |
| 2019/0235693 A1 * | 8/2019 | Luo | ......................... G06F 3/044 |
| 2020/0150805 A1 | 5/2020 | Kim et al. | |
| 2021/0089636 A1 | 3/2021 | Lee et al. | |
| 2021/0174737 A1 * | 6/2021 | Park | ......................... G09G 3/20 |
| 2023/0004274 A1 * | 1/2023 | Shin | ...................... G06F 3/0418 |

FOREIGN PATENT DOCUMENTS

| JP | 2018-060319 A2 | 4/2018 |
| KR | 10-1472080 | 12/2014 |
| KR | 10-1715858 | 3/2017 |

(Continued)

*Primary Examiner* — Krishna P Neupane
(74) *Attorney, Agent, or Firm* — F. CHAU & ASSOCIATES, LLC

(57) ABSTRACT

An electronic device includes a display layer driven at a driving frequency that includes a first driving frequency and a second driving frequency that is smaller than the first driving frequency. The display layer displays an image in a unit of frame A sensor layer is driven in a unit of a report interval in which a first touch signal is provided. A display driver generates a vertical synchronization signal and controls a display layer. A controller controls the sensor layer. The controller calculates the driving frequency of the display layer based on the vertical synchronization signal and changes a cycle of the report interval based on the driving frequency. The controller provides a plurality of the first touch signals to the report interval when the driving frequency is changed from the first driving frequency to the second driving frequency.

20 Claims, 17 Drawing Sheets

(56) References Cited

FOREIGN PATENT DOCUMENTS

| KR | 10-2017-0064599 | | 6/2017 |
|----|-----------------|---|--------|
| KR | 10-2019-0068269 | | 12/2017 |
| KR | 10-2018-0003369 | | 1/2018 |
| KR | 10-2019-0100807 | | 8/2019 |
| KR | 10-2020-0053700 | | 5/2020 |
| KR | 10-2156761 | | 9/2020 |
| KR | 10-2021-0026278 | A | 3/2021 |
| KR | 10-2021-0073695 | A | 6/2021 |

* cited by examiner

1000b

R-AA
R-NAA
}RS

12:34
THU, 07 Oct
21℃

ELECTRONIC DEVICE HAVING A SENSOR LAYER WITH A VARIABLE REPORT INTERVAL

This U.S. non-provisional patent application claims priority under 35 U.S.C. § 119 of Korean Patent Application No. 10-2021-0178084, filed on Dec. 13, 2021, the contents of which are hereby incorporated by reference in its entirety.

TECHNICAL FIELD

The present disclosure relates to an electronic device and, more specifically, to an electronic device having a sensor layer with a variable report interval.

DISCUSSION OF THE RELATED ART

Multimedia devices, such as televisions, mobile phones, tablet computers, navigation devices, and game devices, often include a display panel for displaying an image. The display panel may include a sensor layer that provides a touch-based input method allowing users to easily and intuitively input information or commands by touching the display panel in addition to the usual modes of input, such as a button, a keyboard, a mouse, etc.

SUMMARY

An electronic device includes a display layer driven at a driving frequency including a first driving frequency and a second driving frequency that is smaller than the first driving frequency. The display layer displays an image in a unit of a frame. A sensor layer is disposed on the display layer. The sensor layer is driven according to a report interval in which a first touch signal is provided. The sensor layer includes a plurality of first electrodes extending in a first direction and receiving the first touch signal and a plurality of second electrodes extending in a second direction crossing the first direction and transmitting a second touch signal. A display driver generates a vertical synchronization signal and controls the display layer. A controller controls the sensor layer. The frame includes a valid period in which the vertical synchronization signal is transmitted and a blank period in which the vertical synchronization signal is not transmitted. The controller calculates the driving frequency of the display layer based on the vertical synchronization signal and changes a cycle of the report interval based on the driving frequency. The controller provides a plurality of the first touch signals to the report interval when the driving frequency is changed from the first driving frequency to the second driving frequency.

The report interval may include a first period overlapping the valid period and a second period overlapping the blank period, and first touch signals may be provided in the second period.

The report interval may include a first period overlapping the valid period and a second period overlapping the blank period. A second weight value of the second touch signal obtained in the second period may be greater than a first weight value of the second touch signal obtained in the first period. The controller may calculate touch coordinates based on the second touch signal, the first weight value, and the second weight value.

The report interval may include a first period overlapping the valid period and a second period overlapping the blank period, and the controller may move the first touch signal to the second period in the report interval.

The image may include a first image and a second image different from the first image. The display layer may include a first display area in which the first image is displayed and a second display area in which the second image is displayed. The sensor layer may include a first area overlapping the first display area and a second area overlapping the second display area. The first touch signal may be provided closer to the first area than to the second area.

The first image may include an image to control the second image, and the second image may be displayed based on a first input that is externally provided and may overlap the image.

A first sensing frequency of the report interval of the first display area is greater than a second sensing frequency of the report interval of the second display area.

The sensor layer may senses a first input applied thereto, the sensor layer may include a first sensing area that overlaps the first input and a second sensing area that does not overlap the first input, and the first touch signal may be provided closer to the first sensing area than to the second sensing area.

The first sensing area may be continuously changed in response to a movement of the first input, and the controller may provide the first touch signal in response to the change of the first sensing area.

The display layer may include a first area in which the image is not displayed and a second area adjacent to the first area, and when the image is displayed only in the second area, the controller may transmit the first touch signal to the second electrodes and may receive the second touch signal from the first electrodes.

An electronic device includes a display layer displaying an image in a unit of frame driven at a driving frequency, and the display layer includes a first display area and a second display area adjacent to the first display area. A sensor layer is disposed on the display layer. The sensor layer includes a first area overlapping the first display area and a second area overlapping the second display area. The sensor layer is driven in a unit of a report interval. A controller transmits a first touch signal to the sensor layer and receives a second touch signal, different from the first touch signal, from the sensor layer. The first touch signal is provided closer to the first area than to the second area.

A second sensing frequency of the report interval provided to the second display area may be smaller than a first sensing frequency of the report interval provided to the first display area.

The image may include a first image and a second image that is more dynamic than the first image. For example, the second image may experience more motion (e.g., more changes from frame to frame) than the first image. The first image may be displayed in the first display area, and the second image may be displayed in the second display area.

The sensor layer may sense a first input applied thereto. The first area may overlap the first input. The second area might not overlap the first input. The first area may be continuously changed in response to a movement of the first input.

The sensor layer may include a plurality of first electrodes and a plurality of second electrodes electrically insulated from the first electrodes while crossing the first electrodes. The controller may transmit the first touch signal to the first electrodes and may receive the second touch signal from the second electrodes when the image is displayed in the first and second display areas. The controller may transmit the first touch signal to the second electrodes and may receive the second touch signal from the first electrodes when the image is displayed only in the second display area.

The display layer may be folded with respect to a folding axis extending in a first direction. The first electrodes may extend in a second direction crossing the first direction and may be spaced apart from each other in the first direction. The second electrodes may extend in the first direction and may be spaced apart from each other in the second direction.

The driving frequency may include a first driving frequency and a second driving frequency that is smaller than the first driving frequency. The frame may include a valid period and a blank period provided consecutively to the valid period. The controller may provide a plurality of the first touch signals to a period overlapping the blank period of the report interval when the driving frequency is changed from the first driving frequency to the second driving frequency.

A second weight value of the second touch signal obtained in the period overlapping the blank period may be greater than a first weight value of the second touch signal obtained in a period overlapping the valid period. The controller may calculate touch coordinates based on the second touch signal, the first weight value, and the second weight value.

The controller may move the first touch signal from a first period overlapping the valid period to a second period overlapping the blank period in the report interval.

An electronic device includes a display layer driven at a driving frequency including a first driving frequency and a second driving frequency that is smaller than the first driving frequency. An image is displayed in a unit of a frame. The display layer includes a first display area and a second display area adjacent to the first display area. A sensor layer is disposed on the display layer, driven in a unit of a report interval in which a first touch signal is provided. The sensor layer includes a plurality of first electrodes receiving the first touch signal and a plurality of second electrodes transmitting a second touch signal, and including a first sensing area corresponding to the first display area and a second sensing area corresponding to the second display area, and a controller controlling the sensor layer. The frame includes a valid period in which a vertical synchronization signal is transmitted and a blank period in which the vertical synchronization signal is not transmitted. The controller calculates the driving frequency of the display layer based on the vertical synchronization signal and changes the report interval based on the driving frequency, and the controller provides a plurality of the first touch signals to the report interval when the driving frequency is changed and provides the first touch signal closer to the first sensing area than to the second sensing area.

BRIEF DESCRIPTION OF THE DRAWINGS

The above and other aspects of the present disclosure will become readily apparent by reference to the following detailed description when considered in conjunction with the accompanying drawings, wherein:

FIG. 4 is a block diagram of an electronic device according to an embodiment of the present disclosure;

FIG. 7 is a block diagram of a display layer and a display driver according to an embodiment of the present disclosure;

DETAILED DESCRIPTION

Figure 1:
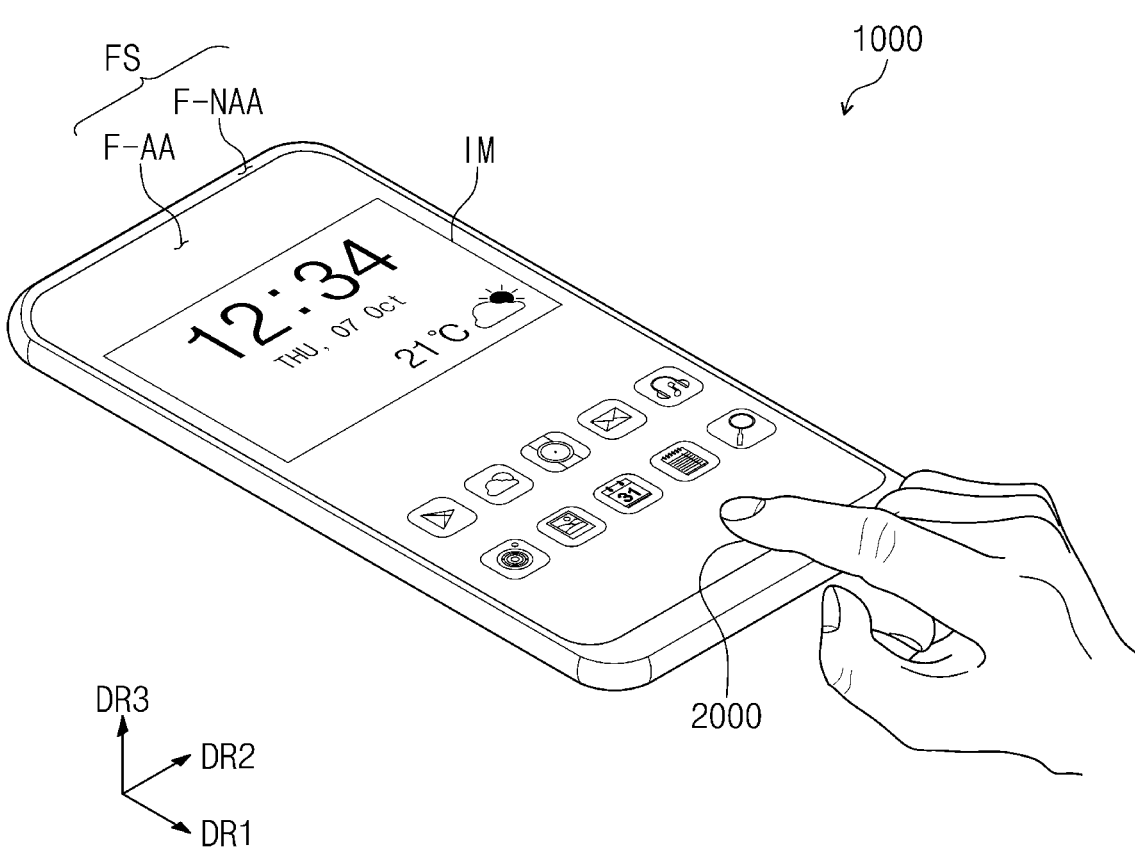
FIG. 1 is a perspective view of an electronic device according to an embodiment of the present disclosure.

In the present disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals may refer to like elements throughout the drawings and the specification. In the drawings, the relative thickness, ratio, relative angles, and relative dimension of components are representative of at least one embodiment of the present disclosure and so it is understood that what is shown in the figures may represent at least one particular example even as changes may be made to what is shown while keeping within the scope of the present disclosure. As used herein, the term "and/or" may include any and all combinations of one or more of the associated listed items.

It will be understood that, although the terms first, second, etc. may be used herein to describe various elements, these elements should not necessarily be limited by these terms. These terms may be used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present disclosure will be described with reference to accompanying drawings.

FIG. 1 is a perspective view of an electronic device 1000 according to an embodiment of the present disclosure.

Referring to FIG. 1, the electronic device 1000 may be a device activated in response to an electrical signal. The electronic device 1000 may include various embodiments. For example, the electronic device 1000 may be applied to a large-sized electronic item, such as a television set, a computer monitor, or an outdoor electronic billboard, and a small and medium-sized electronic item, such as a laptop computer, a notebook computer, a personal digital assistant (PDA), a car navigation unit, a game console, a mobile electronic device, and a digital camera. These are merely examples, and thus, the electronic device 1000 may be applied to other devices within the concept of the present disclosure. In the present embodiment, a smartphone will be described as a representative example of the electronic device 1000.

The electronic device 1000 may display an image IM through a display surface FS thereof, which is substantially parallel to each of a first direction DR1 and a second direction DR2. A thickness of the electronic device 1000 may be measured in a third direction DR3. The display surface FS through which the image IM is displayed may correspond to a front surface of the electronic device 1000. The image IM may be a still image as well as a video image. FIG. 1 shows a clock widget and application icons as a representative example of the image IM.

In the present embodiment, front (or upper) and rear (or lower) surfaces of each member of the electronic device 1000 may be defined with respect to a direction in which the image IM is displayed. The front and rear surfaces may be opposite to each other in the third direction DR3, and a normal line direction of each of the front and rear surfaces may be substantially parallel to the third direction DR3. In the following descriptions, the expression "when viewed in a plane" or "in a plan view" may mean a state of being viewed in the third direction DR3.

A separation distance in the third direction DR3 between the front surface and the rear surface may correspond to a thickness or a height in the third direction DR3 of the electronic device 1000. Meanwhile, directions indicated by the first, second, and third directions DR1, DR2, and DR3 may be relative to each other and may be changed to other directions.

The electronic device 1000 may include the display surface FS. The display surface FS may include an active area F-AA and a peripheral area F-NAA.

The active area F-AA may be activated in response to the electrical signal. The image IM may be displayed through the active area F-AA, and various external inputs may be sensed through the active area F-AA. The peripheral area F-NAA may be defined adjacent to the active area F-AA. The peripheral area F-NAA may have a predetermined color (e.g., it may be blacked out). The peripheral area F-NAA may at least partially surround the active area F-AA. Accordingly, the active area F-AA may have a shape that is substantially defined by the peripheral area F-NAA, however, this is merely an example. According to an embodiment, the peripheral area F-NAA may be defined adjacent to only one side of the active area F-AA or may be omitted. The electronic device 1000 may include active areas of various shapes and should not necessarily be particularly limited to this arrangement.

The electronic device 1000 may sense a user input applied thereto. As an example, the electronic device 1000 may sense the user input applied thereto by a touch of a user' body 2000 or that of a stylus/pen. The user input may include various types of external inputs, such as a part of the user's body, light, heat, or pressure. In addition, the electronic device 1000 may sense an input applied to the side or rear surface of the electronic device 1000 depending on its structure, and it should not necessarily be limited to a specific embodiment.

The electronic device 1000 may sense a first input applied thereto. The first input may include various external inputs generated by the part of the user's body 2000, light, hear, or pressure. In addition, the first input may include touch inputs generated by an input device, such as a stylus pen, an active pen, a touch pen, an electronic pen, an e-pen, or the like, rather than a user's hand. In the present embodiment, a hovering input generated by the user's hand and applied to the front surface of the electronic device 1000 will be described as the first input, however, this is merely an example, and the first input may be provided in various ways. In addition, the electronic device 1000 may sense the first input applied to the side or rear surface of the electronic device 1000 depending on its structure, however, it should not necessarily be particularly limited. The electronic device 1000 may obtain location information (e.g., coordinate information) of the first input.

Figure 2A:
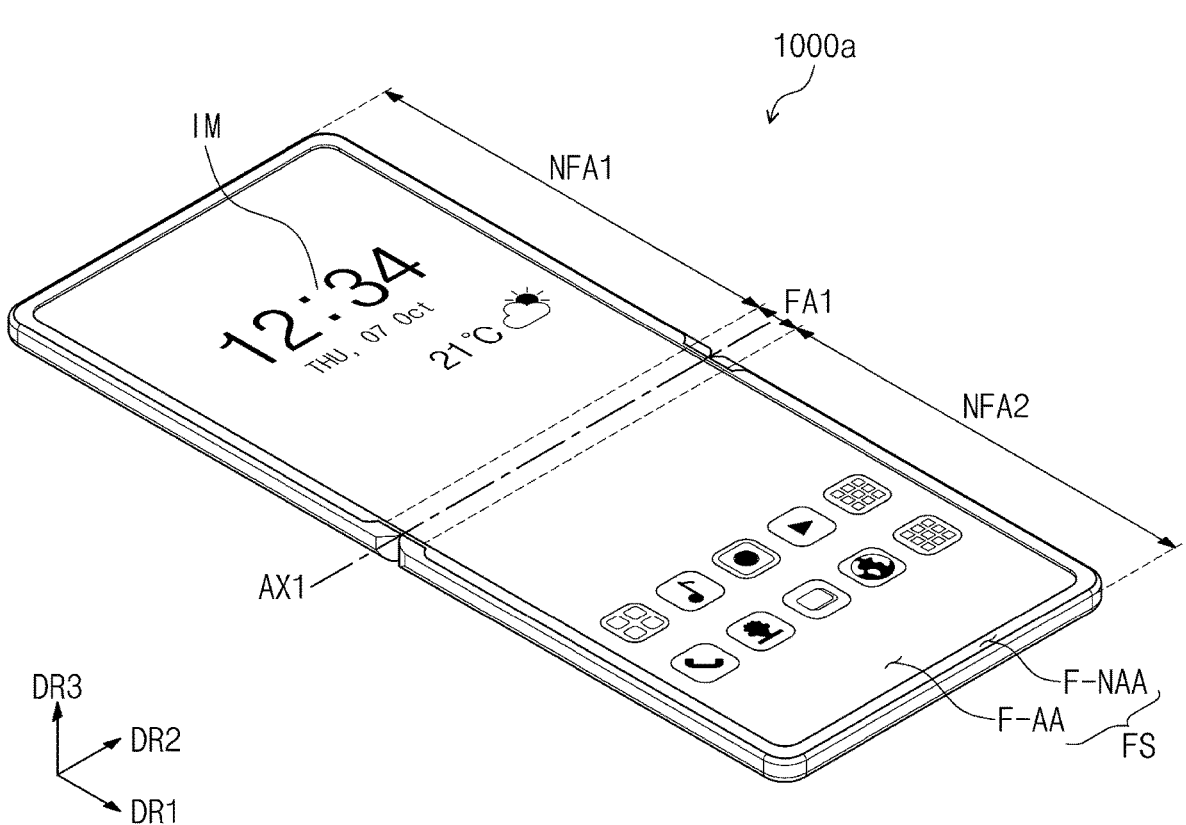
FIG. 2A is a perspective view showing an electronic device in an unfolded state according to an embodiment of the present disclosure.
Figure 2B:
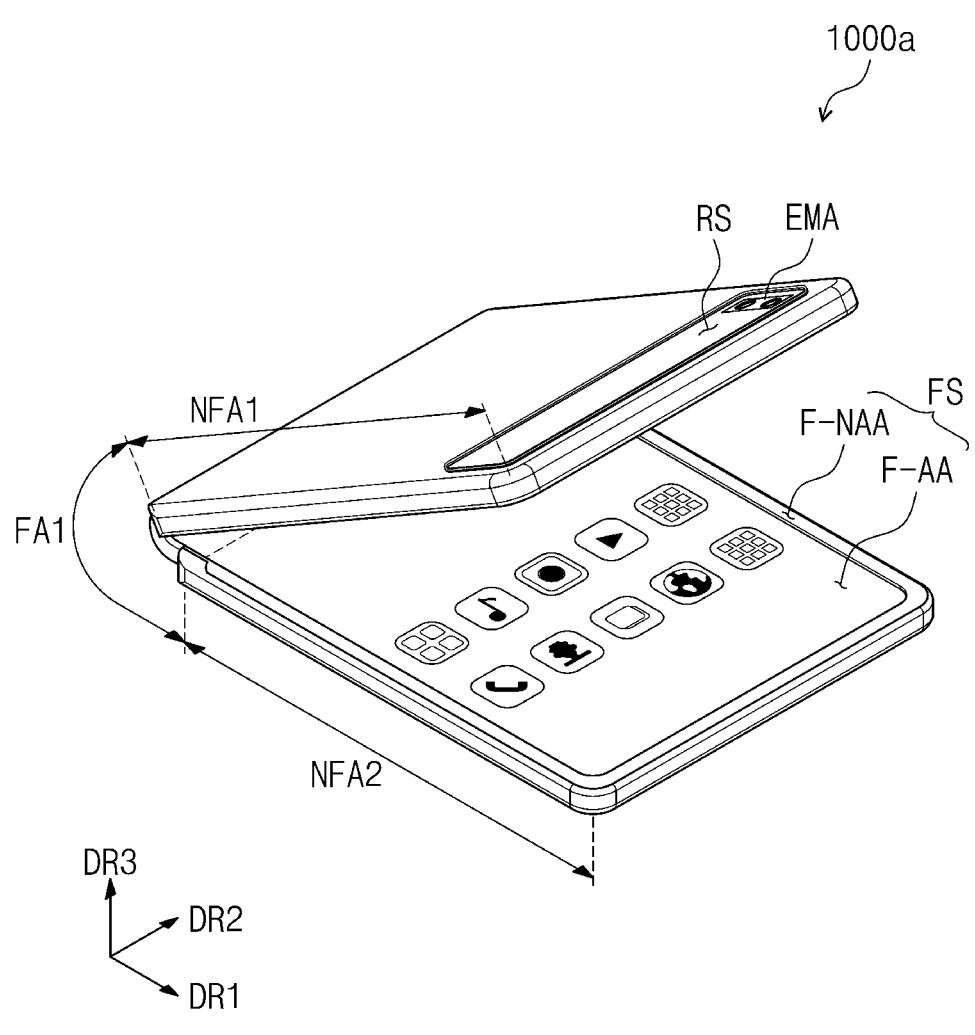
FIG. 2B is a perspective view showing the electronic device shown in FIG. 2A in the midst of an in-folding process.

FIG. 2A is a perspective view showing an electronic device 1000a in an unfolded state according to an embodiment of the present disclosure, and FIG. 2B is a perspective view showing the electronic device 1000a shown in FIG. 2A in the midst of an in-folding process. In FIGS. 2A and 2B, the same reference numerals may denote the same elements in FIG. 1, and thus, to the extent that an element is not described, it may be understood to be at least similar to a corresponding element described elsewhere within the present disclosure.

Referring to FIGS. 2A and 2B, the electronic device 1000a may include a first display surface FS and a second display surface RS.

The second display surface RS may be defined as a surface that is opposite to at least a portion of the first display surface FS. For example, the second display surface RS may be defined as a portion of the rear surface of the electronic device 1000a. The second display surface RS may include an electronic module area EMA.

Various electronic modules may be disposed in the electronic module area EMA. For example, the electronic module may include a camera, a speaker, an optical sensor, and/or a thermal sensor. The electronic module area EMA may sense an external subject through the first and second display surfaces FS and RS. The electronic module may include a plurality of components, and it should not necessarily be limited to a particular embodiment.

The electronic device 1000a may be inwardly or outwardly folded (in-folding or out-folding) about a folding axis AX1. The folding axis AX1 may extend in the second direction DR2. For example, the folding axis AX1 may extend along a minor axis of the electronic device 1000*a*.

As used herein, the phrase "in-folding" will mean that when folded, two portions of the display surface are arranged to face each other such that the display surface is protected when folded and the image might not be visible. The phrase "out-folding" will mean that when folded, two portions of the display surface face away from each other so that the image may continue to be viewable when folded.

A plurality of areas may be defined in the electronic device 1000*a* according to an operation type of the electronic device 1000*a*. The areas may include a folding area FA1 and at least one non-folding area NFA1 and NFA2. The folding area FA1 may be defined between two non-folding areas NFA1 and NFA2.

The folding area FA1 may be an area folded about the folding axis AX1 and substantially forming a curvature. The folding area FA1 may be flexible.

The non-folding areas NFA1 and NFA2 may include a first non-folding area NFA1 and a second non-folding area NFA2. The first non-folding area NFA1 may be disposed adjacent to one side of the folding area FA1, and the second non-folding area NFA2 may be disposed adjacent to the other side of the folding area FA1.

In the present embodiment, the electronic device 1000*a* may include one folding area FA1 defined therein, however, the present disclosure should not necessarily be limited thereto or thereby. According to an embodiment, the electronic device 1000*a* may include a plurality of folding areas defined therein.

In a non-folded state of the electronic device 1000*a*, the first display surface FS may be viewed by the user, and in an in-folded state of the electronic device 1000*a*, the second display surface RS may be viewed by the user.

Figure 3A:
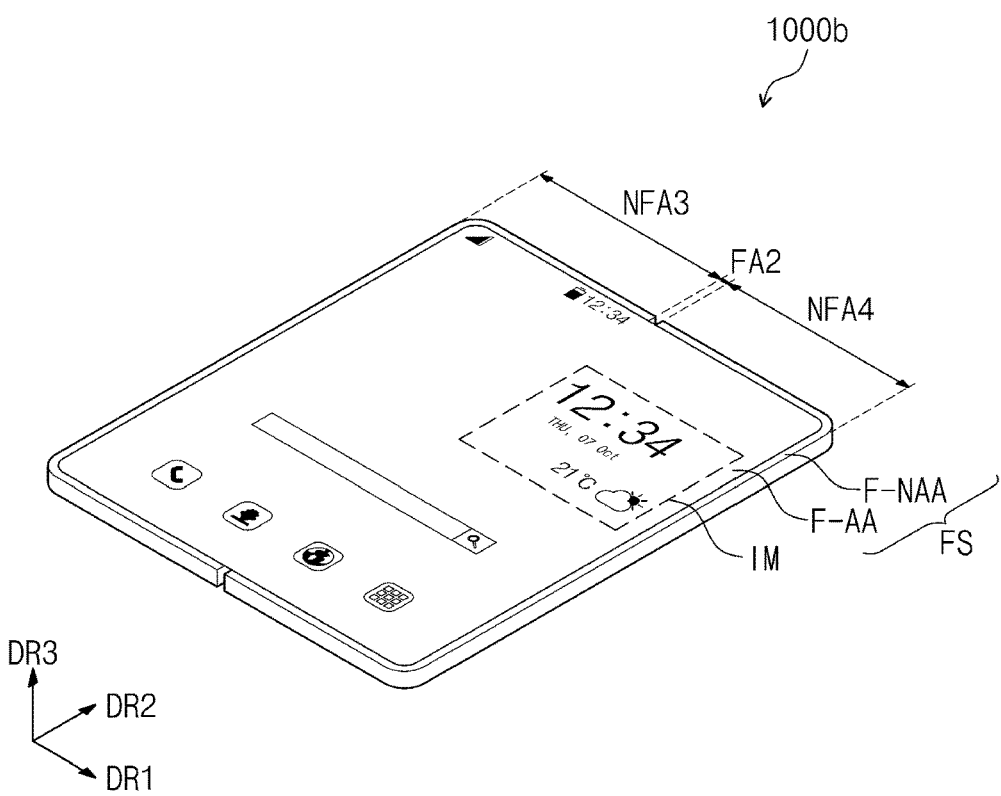
FIG. 3A is a perspective view showing an electronic device in an unfolded state according to an embodiment of the present disclosure.
Figure 3B:
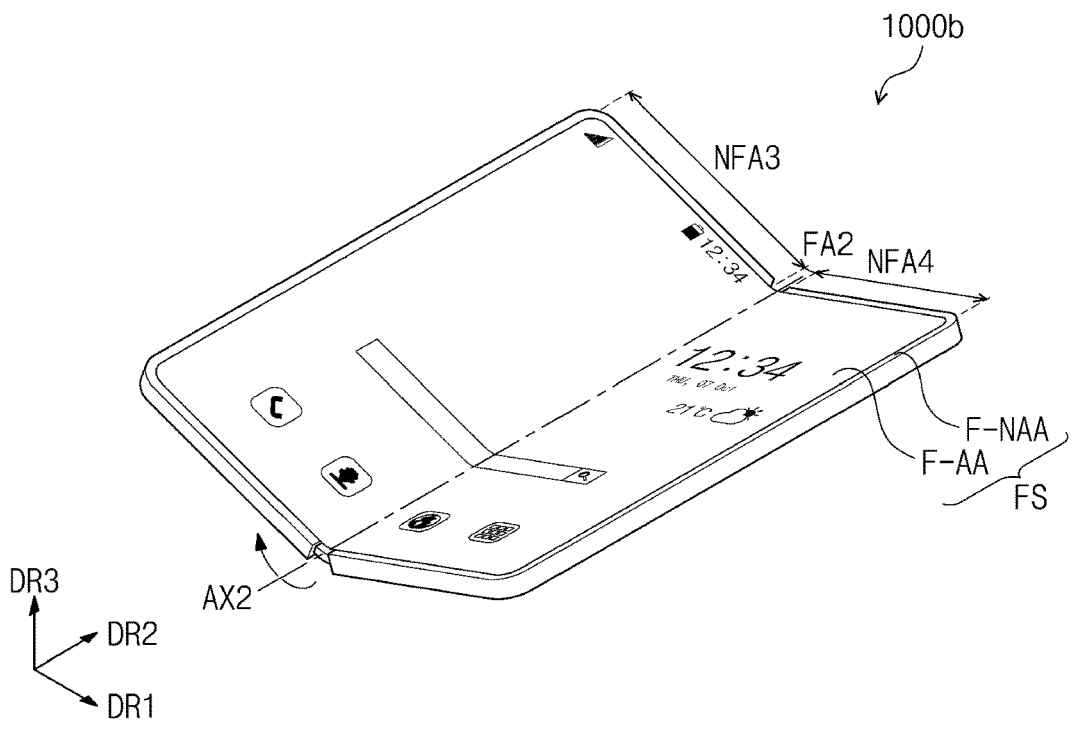
FIG. 3B is a perspective view showing the electronic device shown in FIG. 3A in the midst of an in-folding process.
Figure 3C:
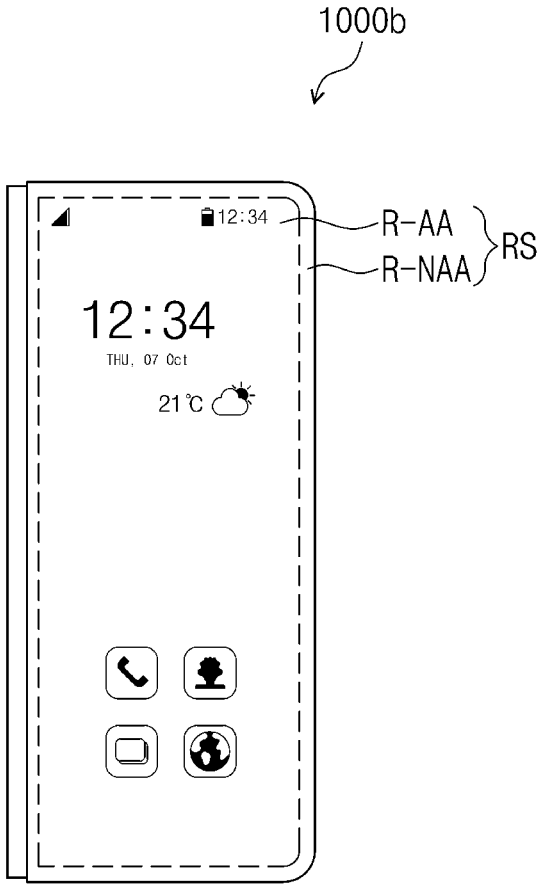
FIG. 3C is a plan view showing an electronic device shown in FIG. 3A in an in-folded state according to an embodiment of the present disclosure.
Figure 3C:
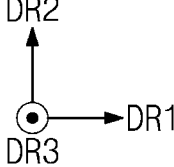
Figure 3D:
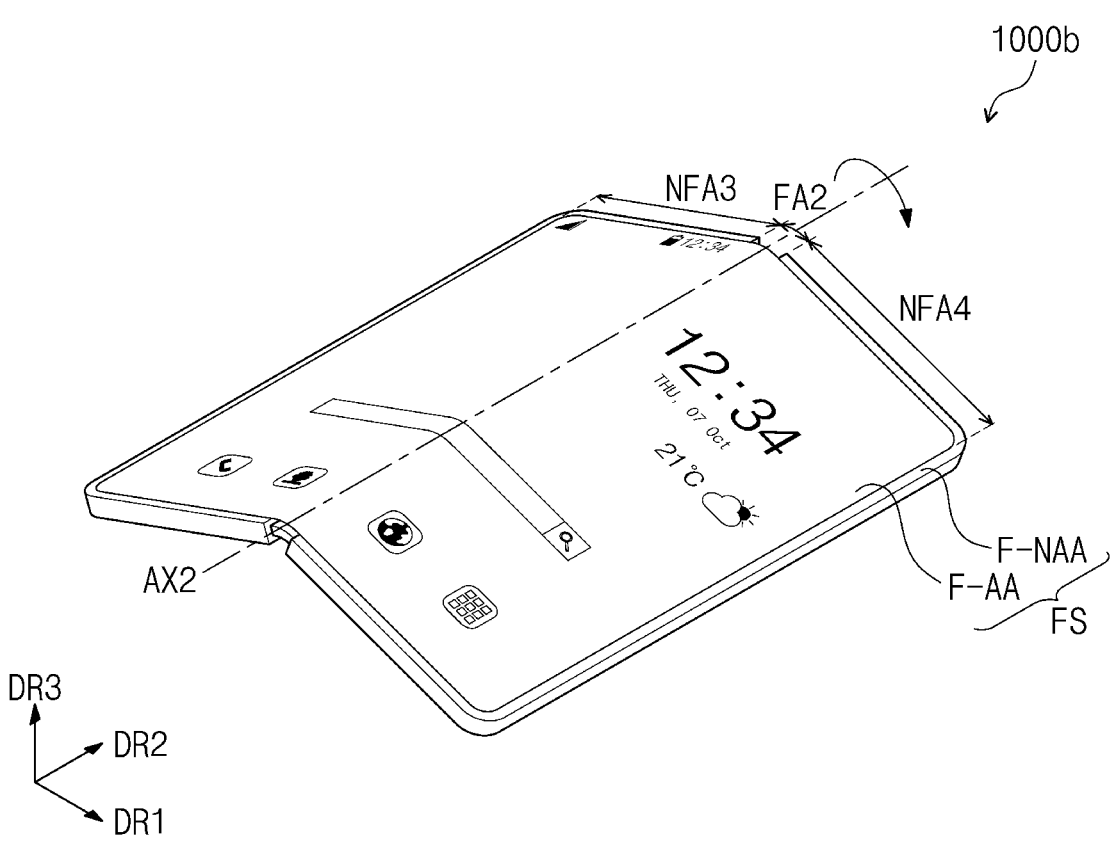
FIG. 3D is a perspective view showing an electronic device in the midst of an out-folding process according to an embodiment of the present disclosure.

FIG. 3A is a perspective view showing an electronic device 1000*b* in an unfolded state according to an embodiment of the present disclosure. FIG. 3B is a perspective view showing the electronic device 1000*b* shown in FIG. 3A in the midst of an in-folding process. FIG. 3C is a plan view showing the electronic device 1000*b* shown in FIG. 3A in an in-folded state according to an embodiment of the present disclosure. FIG. 3D is a perspective view showing the electronic device 1000*b* in the midst of an out-folding process according to an embodiment of the present disclosure. In FIGS. 3A to 3D, to the extent that an element is not described herein, it may be understood to be at least similar to a corresponding element described elsewhere within the present disclosure, for example, with respect to FIGS. 2A and 2B.

Referring to FIG. 3A, the electronic device 1000*b* may include at least one folding area FA2 and a plurality of non-folding areas NFA3 and NFA4 extending from the folding area FA2. The non-folding areas NFA3 and NFA4 may be spaced apart from each other with the folding area FA2 interposed therebetween.

Referring to FIG. 3B, the electronic device 1000*b* may include a folding axis AX2 that extends in the second direction DR2. The folding axis AX2 may extend in the second direction DR2 on a first display surface FS. For example, the folding axis AX2 may extend along a major axis of the electronic device 1000*b*. The folding axis AX1 shown in FIGS. 2A and 2B may extend in the minor axis of the electronic device 1000, and the folding axis AX2 shown in FIGS. 3A to 3D may extend in the major axis of the electronic device 1000*b*.

The electronic device 1000*b* may be folded about the folding axis AX2 to be in an in-folded state where one area of the first display surface FS, which overlaps a first non-folding area NFA3, faces the other area of the first display surface FS, which overlaps a second non-folding area NFA4.

Referring to FIG. 3C, a second display surface RS may be viewed by a user during the in-folded state of the electronic device 1000*b*. In this case, the second display surface RS may include a second active area R-AA through which the image is displayed and a second peripheral area R-NAA adjacent to the second active area R-AA. The second active area R-AA may be activated in response to an electrical signal. The second active area R-AA may be an area through which the image is displayed and various external inputs are sensed. The second peripheral area R-NAA may have a predetermined color. The second peripheral area R-NAA may at least partially surround the second active area R-AA. In addition, the second display surface RS may further include an electronic module area in which an electronic module including various components is disposed, and the second display surface RS should not necessarily be particularly limited thereto.

Referring to FIG. 3D, the electronic device 1000*b* may be folded about the folding axis AX2 to be in an out-folded state where one area of the second display surface RS, which overlaps the first non-folding area NFA3, faces the other area of the second display surface RS, which overlaps the second non-folding area NFA4.

However, the electronic device 1000*b* should not necessarily be limited thereto or thereby. The electronic device 1000*b* may be folded about a plurality of folding axes such that a portion of the first display surface FS and a portion of the second display surface RS may face each other, and the number of the folding axes and the number of non-folding areas should not necessarily be particularly limited thereto.

Figure 4:
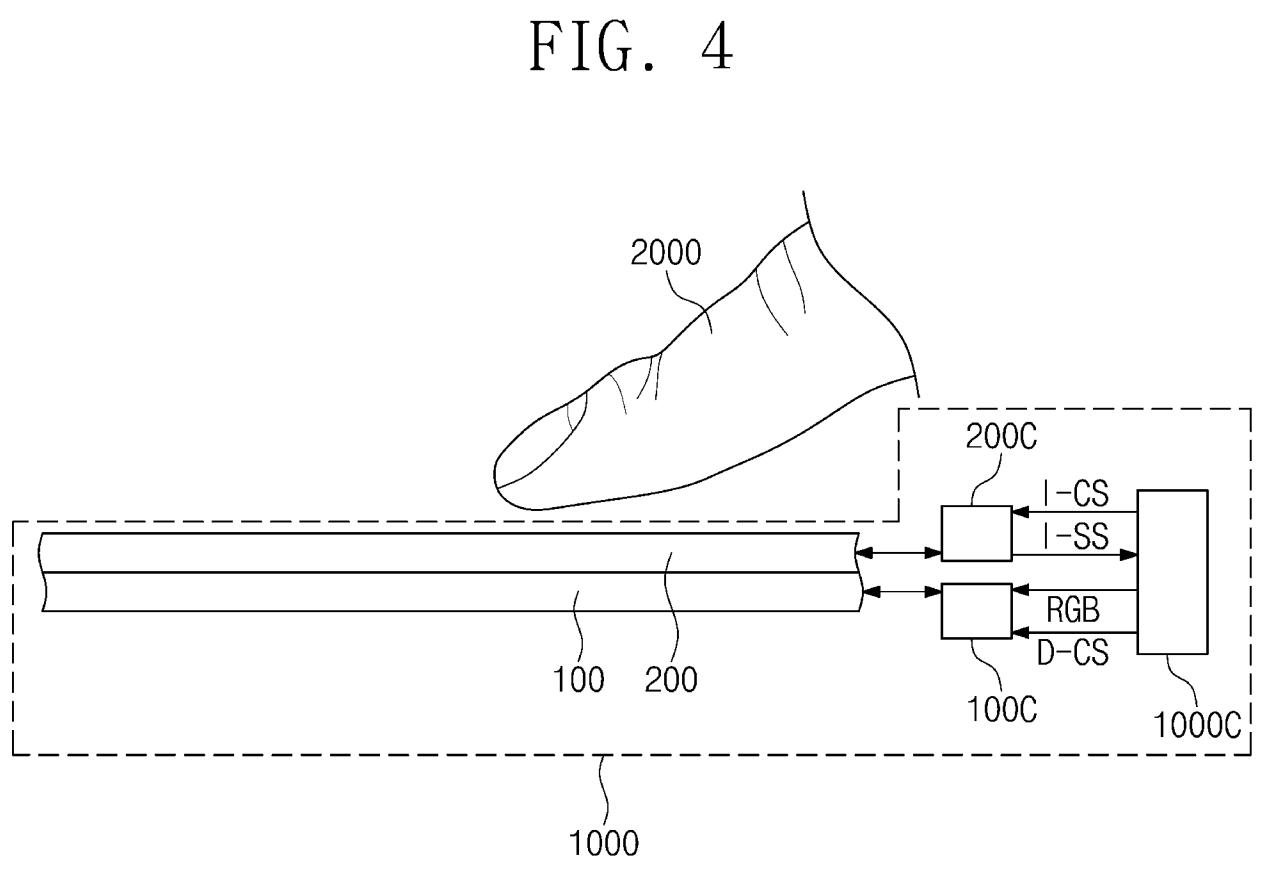

FIG. 4 is a block diagram of an electronic device 1000 according to an embodiment of the present disclosure.

Referring to FIG. 4, the electronic device 1000 may include a display layer 100, a sensor layer 200, a display driver 100C, a controller 200C, and a main controller 1000C.

The display layer 100 may have a configuration to generate the image. The display layer 100 may be a light emitting type display layer, however, it should not necessarily be particularly limited thereto. As an example, the display layer 100 may be an organic light emitting diose (OLED) display layer, a quantum dot display layer, a micro-LED display layer, or a nano-LED display layer. A light emitting layer of the organic light emitting diode display layer may include an organic light emitting material. A light emitting layer of the quantum dot display layer may include a quantum dot or a quantum rod. A light emitting layer of the micro-LED display layer may include a micro-LED. A light emitting layer of the nano-LED display layer may include a nano-LED.

The sensor layer 200 may be disposed on the display layer 100. The sensor layer 200 may sense an external input applied thereto. The sensor layer 200 may be operated in a first mode or a second mode. The sensor layer 200 may sense whether the user's body 2000 is approaching thereto in the first mode. The first mode may be referred to as a proximity recognition mode. The sensor layer 200 may sense an input generated by the touch of the user's body 2000 in the second mode.

The main controller 1000C may control an overall operation of the electronic device 1000. For instance, the main controller 1000C may control an operation of the display driver 100C and the controller 200C. The main controller 1000C may include at least one microprocessor, and the main controller 1000C may be referred to as a host.

The display driver 100C may control a drive of the display layer 100. The main controller 1000C may further include a graphics controller. The display driver 100C may receive image data RGB and a control signal D-CS from the main controller 1000C. The control signal D-CS may include a variety of signals. For example, the control signal D-CS may include an input vertical synchronization signal, an input horizontal synchronization signal, a main clock, and a data enable signal. The display driver 100C may generate a vertical synchronization signal and a horizontal synchronization signal based on the control signal D-CS to control a timing at which signals are applied to the display layer 100.

The controller 200C may control the sensor layer 200. The controller 200C may receive a control signal I-CS from the main controller 1000C. The control signal I-CS may include a mode determination signal to determine a driving mode of the controller 200C and a clock signal. The controller 200C may be operated in the first mode to sense the first input by a proximity input or in the second mode to sense a second input by a touch based on the control signal I-CS. For example, the controller 200C may control the sensor layer 200 to operate in the first mode or the second mode based on the mode determination signal.

The controller 200C may calculate coordinate information of a second input based on the signal from the sensor layer 200 and may apply a coordinate signal I-SS having the coordinate information to the main controller 1000C. The main controller 1000C may perform an operation corresponding to the user's input based on the coordinate signal I-SS. For example, the main controller 1000C may drive the display driver 100C based on the coordinate signal I-SS such that the display layer 100 may display a new application image.

Figure 5A:
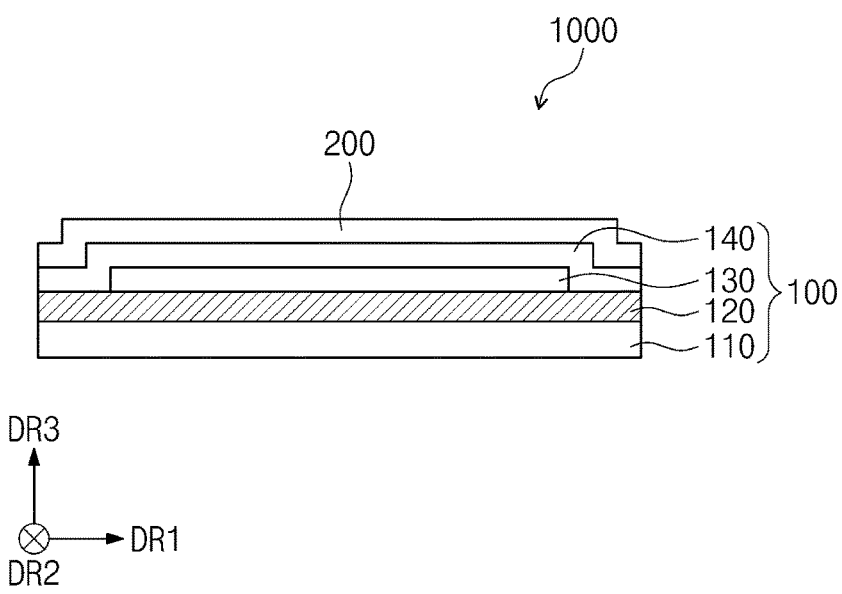
FIG. 5A is a cross-sectional view of an electronic device according to an embodiment of the present disclosure.

FIG. 5A is a cross-sectional view of the electronic device 1000 according to an embodiment of the present disclosure.

Referring to FIG. 5A, the electronic device 1000 may include the display layer 100 and the sensor layer 200. The display layer 100 may include a base layer 110, a circuit layer 120, a light emitting element layer 130, and an encapsulation layer 140.

The base layer 110 may provide a base surface on which the circuit layer 120 is disposed. The base layer 110 may be a glass substrate, a metal substrate, or a polymer substrate, however, the embodiment should not necessarily be limited thereto or thereby. According to an embodiment, the base layer 110 may be an inorganic layer, an organic layer, or a composite material layer.

The base layer 110 may have a multi-layer structure. For instance, the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be referred to as a base barrier layer.

Each of the first and second synthetic resin layers may include a polyimide-based resin. In addition, each of the first and second synthetic resin layers may include an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, and/or a perylene-based resin. In the present disclosure, the term "X-based resin", as used herein, refers to the resin that includes a functional group of X.

The circuit layer 120 may be disposed on the base layer 110. The circuit layer 120 may include an insulating layer, a semiconductor pattern, a conductive pattern, and a signal line. An insulating layer, a semiconductor layer, and a conductive layer may be formed on the base layer 110 by a coating or depositing process. Then, the insulating layer, the semiconductor layer, and the conductive layer may be selectively patterned through several photolithography processes. The semiconductor pattern, the conductive pattern, and the signal line included in the circuit layer 120 may be formed.

The light emitting element layer 130 may be disposed on the circuit layer 120. The light emitting element layer 130 may include a light emitting element. For example, the light emitting element layer 130 may include an organic light emitting material, a quantum dot, a quantum rod, a micro-LED, or a nano-LED.

The encapsulation layer 140 may be disposed on the light emitting element layer 130. The encapsulation layer 140 may protect the light emitting element layer 130 from moisture, oxygen, and a foreign substance such as dust particles.

The sensor layer 200 may be formed on the display layer 100 through successive processes. In this case, the sensor layer 200 may be disposed directly on the display layer 100. In the following descriptions, the expression "the sensor layer 200 is disposed directly on the display layer 100" means that no intervening elements are present between the sensor layer 200 and the display layer 100. For example, a separate adhesive member might not be disposed between the sensor layer 200 and the display layer 100. Alternatively, the sensor layer 200 may be coupled with the display layer 100 by an adhesive layer. The adhesive layer may be a conventional adhesive.

Figure 5B:
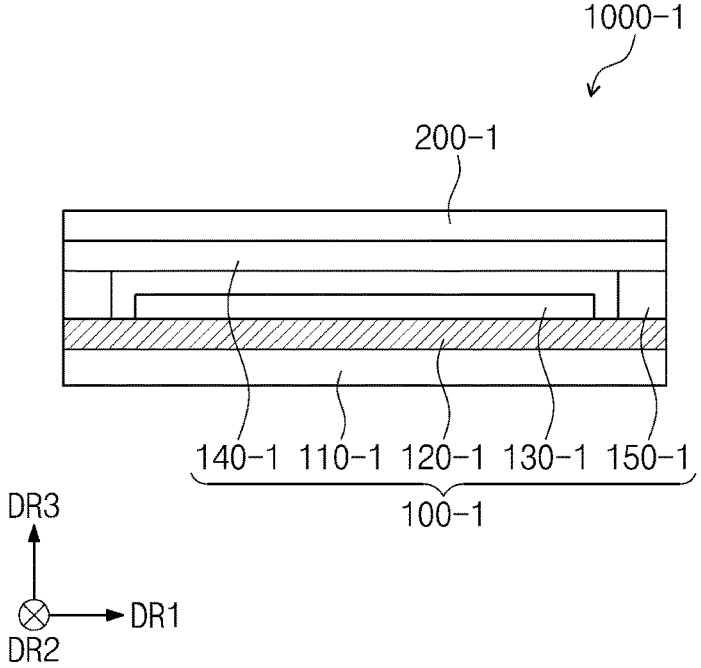
FIG. 5B is a cross-sectional view of an electronic device according to an embodiment of the present disclosure.

FIG. 5B is a cross-sectional view of an electronic device 1000-1 according to an embodiment of the present disclosure.

Referring to FIG. 5B, the electronic device 1000-1 may include a display layer 100-1 and a sensor layer 200-1. The display layer 100-1 may include a base substrate 110-1, a circuit layer 120-1, a light emitting element layer 130-1, an encapsulation substrate 140-1, and a coupling member 150-1.

Each of the base substrate 110-1 and the encapsulation substrate 140-1 may be a glass substrate, a metal substrate, or a polymer substrate, however, the present embodiment should not necessarily be particularly limited thereto.

The coupling member 150-1 may be disposed between the base substrate 110-1 and the encapsulation substrate 140-1. The encapsulation substrate 140-1 may be coupled with the base substrate 110-1 or the circuit layer 120-1 by the coupling member 150-1. The coupling member 150-1 may include an inorganic material or an organic material. For example, the inorganic material may include a frit seal, and the organic material may include a photocurable resin or a photoplastic resin. However, the material for the coupling member 150-1 should not necessarily be limited thereto or thereby.

The sensor layer 200-1 may be disposed directly on the encapsulation substrate 140-1. In the following descriptions, the expression "the sensor layer 200-1 is disposed directly on the encapsulation substrate 140-1" means that no intervening elements are present between the sensor layer 200-1 and the encapsulation substrate 140-1. For example, a separate adhesive member might not be disposed between the sensor layer 200-1 and the display layer 100-1, however, it should not necessarily be limited thereto or thereby. According to an embodiment, an adhesive layer may be further disposed between the sensor layer 200-1 and the encapsulation substrate 140-1.

Figure 6:
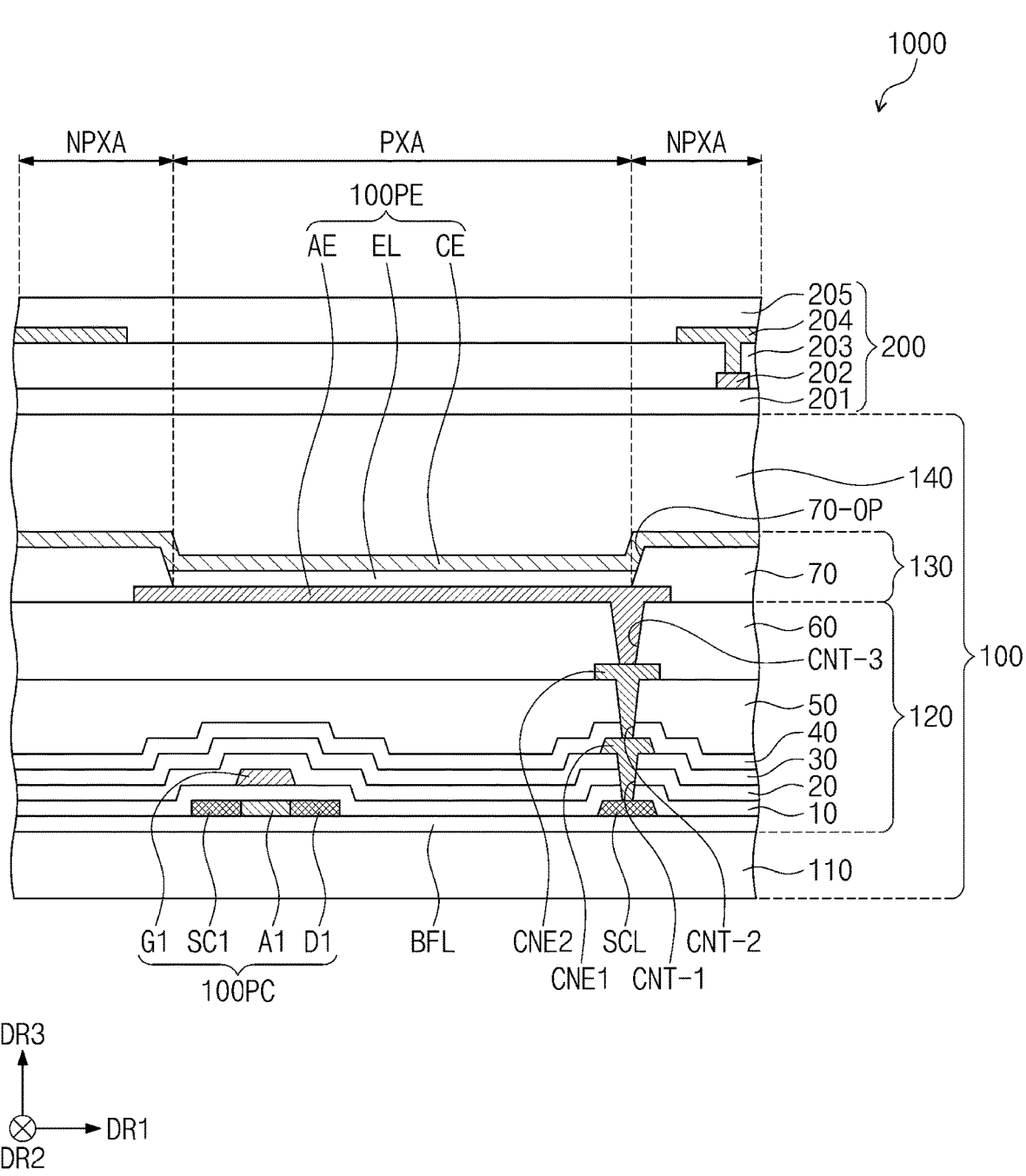
FIG. 6 is a cross-sectional view of an electronic device according to an embodiment of the present disclosure.

FIG. 6 is a cross-sectional view of the electronic device 1000 according to an embodiment of the present disclosure. In FIG. 6, the same reference numerals may denote the same elements in FIG. 5A, and thus, to the extent that an element is not described herein, it may be understood to be at least similar to a corresponding element described elsewhere within the present disclosure.

Referring to FIG. 6, at least one inorganic layer may be formed on an upper surface of the base layer 110. The inorganic layer may include aluminum oxide, titanium oxide, silicon oxide, silicon oxynitride, zirconium oxide, and/or hafnium oxide. The inorganic layer may be formed in multiple layers. The inorganic layers formed in multiple layers may form a barrier layer and/or a buffer layer. In the present embodiment, the display layer 100 may include a buffer layer BFL.

The buffer layer BFL may increase an adhesion between the base layer 110 and the semiconductor pattern. The buffer layer BFL may include a silicon oxide layer and a silicon nitride layer, and the silicon oxide layer and the silicon nitride layer may be alternately stacked with each other.

The semiconductor pattern may be disposed on the buffer layer BFL. The semiconductor pattern may include poly-silicon, however, it should not necessarily be limited thereto or thereby. The semiconductor pattern may include amorphous silicon, low-temperature polycrystalline silicon, or oxide semiconductor.

FIG. 6 shows a portion of the semiconductor pattern, and the semiconductor pattern may be further disposed in other areas. The semiconductor pattern may be arranged with a specific structure over pixels. The semiconductor pattern may have different electrical properties depending on whether it is doped or not or whether it is doped with an N-type dopant or a P-type dopant. The semiconductor pattern may include a first region with high conductivity and a second region with low conductivity. The first region may be doped with the N-type dopant or the P-type dopant. A P-type transistor may include a doped region doped with the P-type dopant, and an N-type transistor may include a doped region doped with the N-type dopant. The second region may be a non-doped region or may be doped at a concentration lower than the first region.

The first region may have a conductivity that is greater than that of the second region and may substantially serve as an electrode or a signal line. The second region may substantially correspond to an active (or a channel) of a transistor. For example, a portion of the semiconductor pattern may be the active of the transistor, another portion of the semiconductor pattern may be a source or a drain of the transistor, and the other portion of the semiconductor pattern may be a connection electrode or a connection signal line.

Each of the pixels may have an equivalent circuit that includes seven transistors, one capacitor, and the light emitting element, and the equivalent circuit of the pixels may be changed in various ways. FIG. 6 shows one transistor 100PC and the light emitting element 100PE included in the pixel.

The transistor 100PC may include a source SC1, an active A1, a drain D1, and a gate G1. The source SC1, the active A1, and the drain D1 may be formed from the semiconductor pattern. The source SC1 and the drain D1 may extend in opposite directions to each other from the active A1 in a cross-section. FIG. 6 shows a portion of the connection signal line SCL formed from the semiconductor pattern. The connection signal line SCL may be electrically connected to the drain D1 of the transistor 100PC in a plan view.

A first insulating layer 10 may be disposed on the buffer layer BFL. The first insulating layer 10 may commonly overlap the pixels and may cover the semiconductor pattern. The first insulating layer 10 may be an inorganic layer and/or an organic layer and may have a single-layer or multi-layer structure. The first insulating layer 10 may include aluminum oxide, titanium oxide, silicon oxide, silicon nitride, silicon oxynitride, zirconium oxide, and/or hafnium oxide. In the present embodiment, the first insulating layer 10 may have a single-layer structure of a silicon oxide layer. Not only the first insulating layer 10, but also an insulating layer of the circuit layer 120 described later may be an inorganic layer and/or an organic layer and may have a single-layer or multi-layer structure. The inorganic layer may include at least one of the above-mentioned materials, however, it should not necessarily be limited thereto.

The gate G1 may be disposed on the first insulating layer 10. The gate G1 may be a portion of a metal pattern. The gate G1 may overlap the active A1. The gate G1 may be used as a mask in a process of doping the semiconductor pattern.

A second insulating layer 20 may be disposed on the first insulating layer 10 and may cover the gate G1. The second insulating layer 20 may commonly overlap the pixels. The second insulating layer 20 may be an inorganic layer and/or an organic layer and may have a single-layer or multi-layer structure. The second insulating layer 20 may include silicon oxide, silicon nitride, and silicon oxynitride. In the present embodiment, the second insulating layer 20 may have a multi-layer structure of a silicon oxide layer and/or a silicon nitride layer.

A third insulating layer 30 may be disposed on the second insulating layer 20. The third insulating layer 30 may have a single-layer structure or a multi-layer structure. As an example, the third insulating layer 30 may have the multi-layer structure of a silicon oxide layer and a silicon nitride layer.

A first connection electrode CNE1 may be disposed on the third insulating layer 30. The first connection electrode CNE1 may be connected to the connection signal line SCL via a contact hole CNT-1 defined through the first, second, and third insulating layers 10, 20, and 30.

A fourth insulating layer 40 may be disposed on the third insulating layer 30. The fourth insulating layer 40 may have a single-layer structure of a silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 via a contact hole CNT-2 defined through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic light emitting material, a quantum dot, a quantum rod, a micro-LED, or a nano-LED. Hereinafter, the organic light emitting element will be described as the light emitting element 100PE, however, the light emitting element 100PE should not necessarily be particularly limited thereto.

The light emitting element 100PE may include a first electrode AE, a light emitting layer EL, and a second electrode CE. The first electrode AE may be disposed on the sixth insulating layer 60. The first electrode AE may be connected to the second connection electrode CNE2 via a contact hole CNT-3 defined through the sixth insulating layer 60.

A pixel definition layer 70 may be disposed on the sixth insulating layer 60 and may cover a portion of the first electrode AE. An opening 70-OP may be defined through the pixel definition layer 70. At least a portion of the first electrode AE may be exposed through the opening 70-OP of the pixel definition layer 70.

The active area F-AA (refer to FIG. 1) may include a light emitting area PXA and a non-light-emitting area NPXA adjacent to the light emitting area PXA. The non-light-emitting area NPXA may at least partially surround the light emitting area PXA. In the present embodiment, the light emitting area PXA may be defined to correspond to the portion of the first electrode AE exposed through the opening 70-OP.

The light emitting layer EL may be disposed on the first electrode AE. The light emitting layer EL may be disposed in an area corresponding to the opening 70-OP. For example, the light emitting layer EL may be formed in each of the pixels after being divided into plural portions. In the case where the light emitting layer EL is formed in each of the pixels after being divided into plural portions, each of the light emitting layers EL may emit blue, red, and/or light, however, it should not necessarily be limited thereto or thereby. The light emitting layer EL may be commonly provided in the pixels. In this case, the light emitting layer EL may provide a blue light or a white light.

The second electrode CE may be disposed on the light emitting layer EL. The second electrode CE may have an integral shape and may be commonly disposed over the pixels.

A hole control layer may be disposed between the first electrode AE and the light emitting layer EL. The hole control layer may be commonly disposed in the light emitting area PXA and the non-light-emitting area NPXA. The hole control layer may include a hole transport layer and may further include a hole injection layer. An electron control layer may be disposed between the light emitting layer EL and the second electrode CE. The electron control layer may include an electron transport layer and may further include an electron injection layer. The hole control layer and the electron control layer may be commonly formed in the plural pixels using an open mask.

The encapsulation layer 140 may be disposed on the light emitting element layer 130. The encapsulation layer 140 may include an inorganic layer, an organic layer, and an inorganic layer, which are sequentially stacked, however, layers of the encapsulation layer 140 should not necessarily be limited thereto or thereby.

The inorganic layers may protect the light emitting element layer 130 from moisture and oxygen, and the organic layer may protect the light emitting element layer 130 from a foreign substance such as dust particles. Each of the inorganic layers may include a silicon nitride layer, a silicon oxynitride layer, a silicon oxide layer, a titanium oxide layer, or an aluminum oxide layer. The organic layer may include an acrylic-based organic layer, however, it should not necessarily be limited thereto or thereby.

The sensor layer 200 may be formed on the display layer 100 through successive processes. For example, the sensor layer 200 may be disposed directly on the display layer 100. In the present disclosure, the expression "the sensor layer 200 is disposed directly on the display layer 100" means that no intervening elements are present between the sensor layer 200 and the display layer 100. For example, a separate adhesive member might not be disposed between the sensor layer 200 and the display layer 100. Alternatively, the sensor layer 200 may be coupled with the display layer 100 by the adhesive layer. The adhesive layer may be the conventional adhesive.

The sensor layer 200 may include a base insulating layer 201, a first conductive layer 202, a sensing insulating layer 203, a second conductive layer 204, and a cover insulating layer 205.

The base insulating layer 201 may be an inorganic layer that includes silicon nitride, silicon oxynitride, and/or silicon oxide. Alternatively, the base insulating layer 201 may be an organic layer that includes an epoxy-based resin, an acrylic-based resin, or an imide-based resin. The base insulating layer 201 may have a single-layer structure or a multi-layer structure of layers stacked one on another in the third direction DR3.

Each of the first conductive layer 202 and the second conductive layer 204 may have a single-layer structure or a multi-layer structure of layers stacked in the third direction DR3.

The conductive layer having the single-layer structure may include a metal layer or a transparent conductive layer. The metal layer may include molybdenum, silver, titanium, copper, aluminum, or alloys thereof. The transparent conductive layer may include a transparent conductive oxide, such as indium tin oxide (ITO), indium zinc oxide (IZO), zinc oxide (ZnO), indium zinc tin oxide (IZTO), or the like. In addition, the transparent conductive layer may include a conductive polymer such as PEDOT, a metal nanowire, a graphene, or the like.

The conductive layer having the multi-layer structure may include metal layers. The metal layers may have, for example, a three-layer structure of titanium/aluminum/titanium. The conductive layer having the multi-layer structure may include at least one metal layer and at least one transparent conductive layer.

The sensing insulating layer 203 and/or the cover insulating layer 205 may include an inorganic layer. The inorganic layer may include aluminum oxide, titanium oxide, silicon oxide, silicon nitride, silicon oxynitride, zirconium oxide, and/or hafnium oxide.

The sensing insulating layer 203 and/or the cover insulating layer 205 may include an organic layer. The organic layer may include an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, and/or a perylene-based resin.

Figure 7:
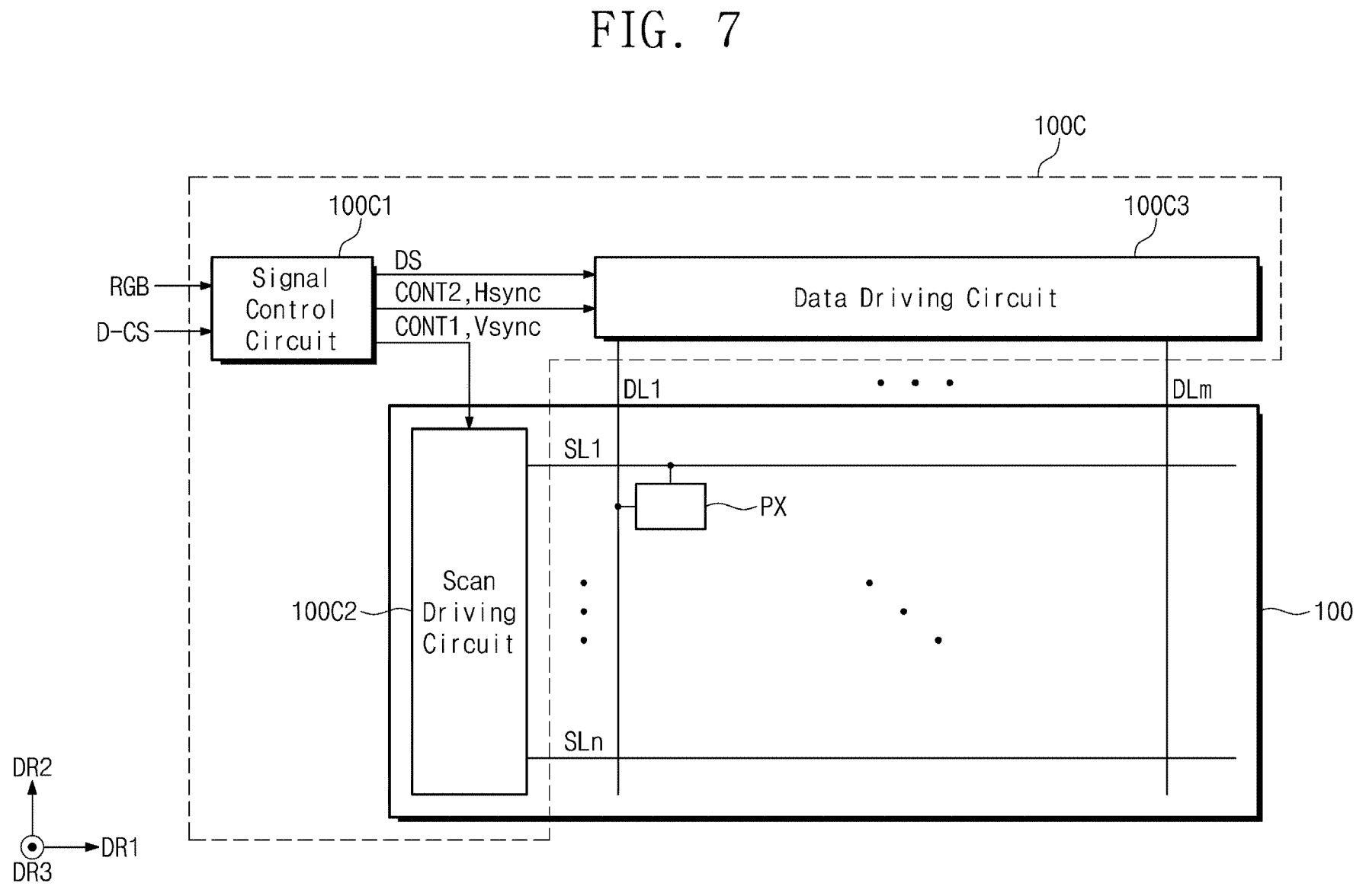

FIG. 7 is a block diagram of the display layer 100 and the display driver 100C according to an embodiment of the present disclosure.

Referring to FIG. 7, the display layer 100 may include a plurality of scan lines SL1 to SLn, a plurality of data lines DL1 to DLm, and a plurality of pixels PX. Each of the pixels PX may be connected to a corresponding data line of the data lines DL1 to DLm and a corresponding scan line of the scan lines SL1 to SLn. According to an embodiment, the display layer 100 may further include light emission control lines, and the display driver 100C may further include a light emission driving circuit applying control signals to the light emission control lines. Configurations of the display layer 100 should not necessarily be particularly limited thereto.

The display driver 100C may include a signal control circuit 100C1, a scan driving circuit 100C2, and a data driving circuit 100C3.

The signal control circuit 100C1 may receive the image data RGB and the control signal D-CS from the main controller 1000C (refer to FIG. 4). The control signal D-CS may include a variety of signals. As an example, the control signal D-CS may include the input vertical synchronization signal, the input horizontal synchronization signal, the main clock, and the data enable signal.

The signal control circuit 100C1 may generate a first control signal CONT1 and the vertical synchronization signal Vsync based on the control signal D-CS and may output the first control signal CONT1 and the vertical synchronization signal Vsync to the scan driving circuit 100C2. The vertical synchronization signal Vsync may be included in the first control signal CONT1.

The signal control circuit 100C1 may generate a second control signal CONT2 and the horizontal synchronization signal Hsync based on the control signal D-CS, and the horizontal synchronization signal Hsync may be included in the second control signal CONT2.

In addition, the signal control circuit 100C1 may output a data signal DS obtained by processing the image data RGB according to an operational condition of the display layer 100 to the data driving circuit 100C3. The first control signal CONT1 and the second control signal CONT2 may be signals required for an operation of the scan driving circuit 100C2 and the data driving circuit 100C3 and should not be particularly limited.

The signal control circuit 100C1 may determine a driving frequency and may control the scan driving circuit 100C2 and the data driving circuit 100C3 according to the determined driving frequency.

The scan driving circuit 100C2 may drive the scan lines SL1 to SLn in response to the first control signal CONT1 and the vertical synchronization signal Vsync. According to an embodiment, the scan driving circuit 100C2 may be formed through the same process as the circuit layer 120 (refer to FIG. 5) of the display layer 100, however, it should not necessarily be limited thereto or thereby. As an example, the scan driving circuit 100C2 may be directly mounted on a predetermined area of the display layer 100 after being implemented in an integrated circuit (IC) or may be electrically connected to the display layer 100 after being mounted on a separate printed circuit board in a chip-on-film (COF).

The data driving circuit 100C3 may output grayscale voltages to drive the data lines DL1 to DLm in response to the second control signal CONT2, the horizontal synchronization signal Hsync, and the data signal DS from the signal control circuit 100C1. The data driving circuit 100C3 may be directly mounted on a predetermined area of the display layer 100 after being implemented in an integrated circuit (IC) or may be electrically connected to the display layer 100 after being mounted on a separate printed circuit board in a chip-on-film (COF), however, it should not necessarily be limited thereto or thereby. For example, the data driving circuit 100C3 may be formed through the same process as the circuit layer 120 (refer to FIG. 6) of the display layer 100.

Figure 8:
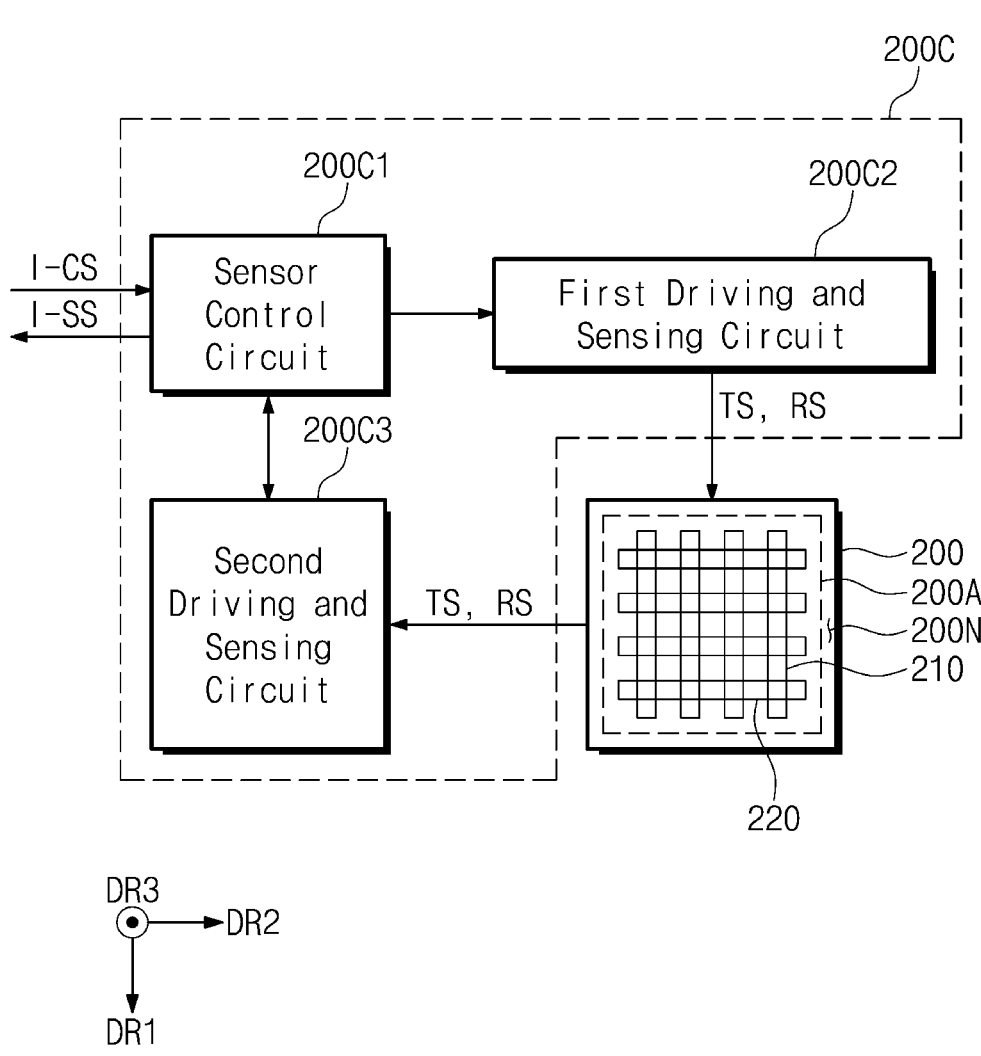
FIG. 8 is a block diagram of a sensor layer and a controller according to an embodiment of the present disclosure.

FIG. 8 is a block diagram of the sensor layer 200 and the controller 200C according to an embodiment of the present disclosure.

Referring to FIG. 8, the sensor layer 200 may include an active area 200A and a peripheral area 200N. The active area 200A may be activated in response to an electrical signal. For example, the active area 200A may be an area configured to sense the input.

The sensor layer 200 may include a plurality of first electrodes 210 and a plurality of second electrodes 220.

Each of the first electrodes 210 may extend in the first direction DR1, and the first electrodes 210 may be spaced apart from each other in the second direction DR2. Each of the second electrodes 220 may extend in the second direction DR2, and the second electrodes 220 may be spaced apart from each other in the first direction DR1.

The controller 200C may be electrically connected to the sensor layer 200. The controller 200C may control the sensor layer 200. The controller 200C may receive the control signal I-CS from the main controller 1000C (refer to FIG. 4) and may apply the coordinate signal I-SS to the main controller 1000C.

The controller 200C may include a sensor control circuit 200C1, a first driving and sensing circuit 200C2, and a second driving and sensing circuit 200C3. The sensor control circuit 200C1, the first driving and sensing circuit 200C2, and the second driving and sensing circuit 200C3 may be implemented in a single chip, or some of the sensor control circuit 200C1, the first driving and sensing circuit 200C2, and the second driving and sensing circuit 200C3 may be implemented in a different chip from the other of the sensor control circuit 200C1, the first driving and sensing circuit 200C2, and the second driving and sensing circuit 200C3.

The sensor control circuit 200C1 may control an operation of one of the first driving and sensing circuit 200C2 and the second driving and sensing circuit 200C3, and the sensor control circuit 200C1 may calculate coordinates of the external input based on a signal applied thereto from the other of the first driving and sensing circuit 200C2 and the second driving and sensing circuit 200C3.

One of the first driving and sensing circuit 200C2 and the second driving and sensing circuit 200C3 may apply a first touch signal TS (or a driving signal) that is called a TX signal to the sensor layer 200. One of the first driving and sensing circuit 200C2 and the second driving and sensing circuit 200C3 may output an output signal corresponding to an operational mode to sensor layer 200.

The other of the first driving and sensing circuit 200C2 and the second driving and sensing circuit 200C3 may convert a second touch signal RS (or a sensing signal), which is an analog signal called an RX signal, provided from the sensor layer 200 to a digital signal. The other of the first driving and sensing circuit 200C2 and the second driving and sensing circuit 200C3 may amplify the received analog signal and may filter the amplified signal. The other of the first driving and sensing circuit 200C2 and the second driving and sensing circuit 200C3 may convert the filtered signal to the digital signal.

The sensor control circuit 200C1 may include a switching circuit that selects one circuit from which the first touch signal TS is provided between the first driving and sensing circuit 200C2 and the second driving and sensing circuit 200C3 or one circuit to which the second touch signal RS is applied between the first driving and sensing circuit 200C2 and the second driving and sensing circuit 200C3.

Figure 9:
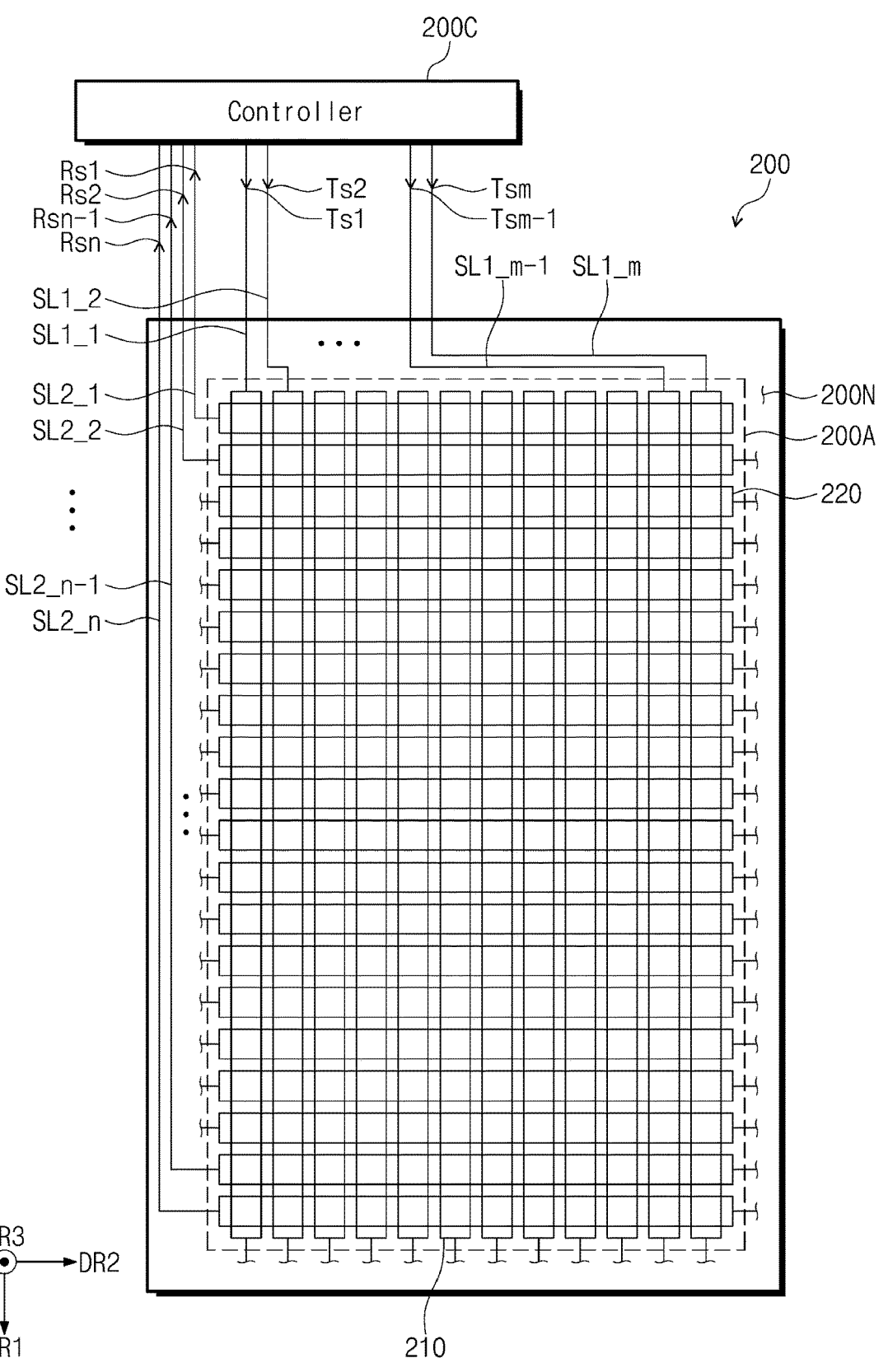
FIG. 9 is a plan view of a sensor layer according to an embodiment of the present disclosure.

FIG. 9 is a plan view of the sensor layer 200 according to an embodiment of the present disclosure. In FIG. 9, the same reference numerals may denote the same elements in FIG. 8, and thus, to the extent that an element is not described herein, it may be understood to be at least similar to a corresponding element described elsewhere within the present disclosure.

Referring to FIG. 9, the sensor layer 200 may include the first electrodes 210, the second electrodes 220, a plurality of first lines SL1_1 to SL1_m, and a plurality of second lines SL2_1 to SL2_n. The active area 200A and the peripheral area 200N adjacent to the active area 200A may be defined in the sensor layer 200. The first electrodes 210 and the second electrodes 220 may be disposed in the active area 200A. The first lines SL1_1 to SL1_m and the second lines SL2_1 to SL2_n may be disposed in the peripheral area 200N.

The first lines SL1_1 to SL1_m may be electrically connected to one sides of the first electrodes 210, respectively. The second lines SL2_1 to SL2_n may be electrically connected to one sides of the second electrodes 220, respectively. However, the present disclosure should not necessarily be limited thereto or thereby. As an example, the sensor layer 200 may further include a plurality of third lines electrically connected to the other sides of the second electrodes 220, respectively.

The controller 200C may be electrically connected to the sensor layer 200. The controller 200C may be electrically connected to the first electrodes 210 and the second electrodes 220.

The controller 200C may sense a position of the user's body 2000 based on the sensing signal reflecting a variation in capacitance between the first electrodes 210 and the second electrodes 220, which is caused by the first input generated by the user's body 2000 (refer to FIG. 4).

The variation in the capacitance may mean a difference in capacitance between a capacitance before an input by the input device, e.g., the user's body 2000 (refer to FIG. 4), and a capacitance after the input by the input device, e.g., the user's body 2000 (refer to FIG. 4).

The first electrodes 210 may be electrically connected to the controller 200C via the first lines SL1_1 to SL1_m, and the second electrodes 220 may be electrically connected to the controller 200C via the second lines SL2_1 to SL2_n.

The controller 200C may transmit a plurality of first touch signals Ts1 to Tsm to the first electrodes 210 and may receive a plurality of second touch signals Rs1 to Rsn reflecting the variation in capacitance between the first electrodes 210 and the second electrodes 220 from the second electrodes 220.

The first touch signals Ts1 to Tsm may correspond to the first touch signal TS (refer to FIG. 8) of FIG. 7, and the second touch signals Rs1 to Rsn may correspond to the second touch signal RS (refer to FIG. 8) of FIG. 7.

Figure 10:
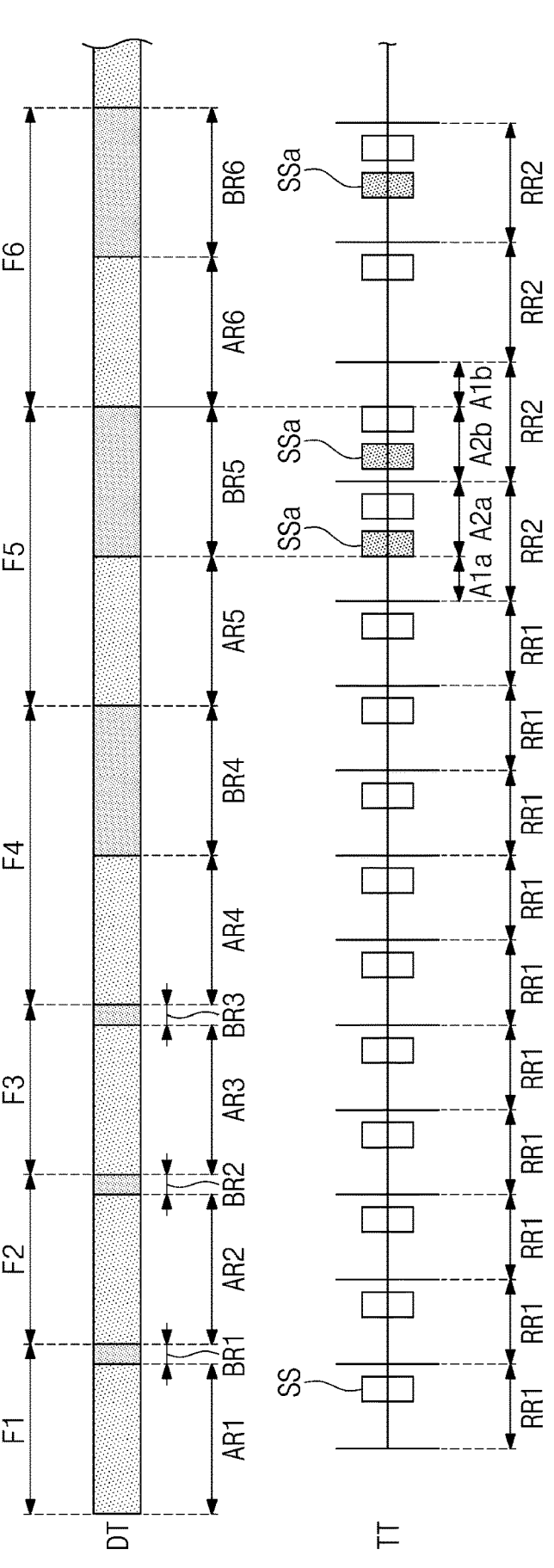
FIG. 10 is a timing diagram showing a drive of an electronic device according to an embodiment of the present disclosure.

FIG. 10 is a timing diagram showing a drive of an electronic device according to an embodiment of the present disclosure.

FIG. 10 shows a display timing DT and a sensing timing TT along a time axis.

Referring to FIGS. 7, 8, and 10, the display timing DT shows a plurality of frames of the image IM (refer to FIG. 1) displayed through the display layer 100 along a time axis.

The electronic device 1000 may synchronize a frame generation timing by a graphic processing device included in the electronic device 1000 with a frame output timing by the display layer 100. For example, the display layer 100 may be operated with a variable driving frequency. In this case, the display layer 100 may be referred to as operating in a variable frequency mode. As an example, when the driving frequency of the electronic device 1000 is lowered in a specific operating environment, such as displaying a still image, a power consumption of the electronic device 1000 may be reduced. The driving frequency may refer to a frequency at which a new data signal DS is transmitted to all pixels PX in the display layer 100.

Each of the frames F1 to F6 may be a period during which the image IM (refer to FIG. 1) is displayed based on the data signal DS (refer to FIG. 7).

The display layer 100 may operate at a first driving frequency in a first frame F1. As an example, the first driving frequency may be about 144 Hz (Hertz).

The first frame F1 may include a first valid period AR1 and a first blank period BR1.

The display layer 100 may operate at a first frequency in the first valid period AR1. The first valid period AR1 may be a period in which the vertical synchronization signal Vsync is transmitted.

In a case where a new data signal DS is not received after the first valid period AR1, the first blank period BR1 may proceed. A cycle of the first blank period BR1 may be defined based on a time point at which a next data signal DS is input. The first blank period BR1 may be a period in which the vertical synchronization signal Vsync is not transmitted.

As an example, the display layer 100 may display the image IM (refer to FIG. 1) based on the data signal DS in the first valid period AR1. In the first blank period BR1, the display layer 100 may maintain an image displaying state based on the data signal DS that is last transmitted in the first valid period AR1.

A second frame F2 may proceed after the first frame F1. The second frame F2 may operate at the first driving frequency. The second frame F2 may include a second valid period AR2 and a second blank period BR2.

The second valid period AR2 may proceed after the first blank period BR1. The second valid period AR2 may operate at the first frequency. The second valid period AR2 may be a period in which the vertical synchronization signal Vsync is transmitted.

The second blank period BR2 may proceed after the second valid period AR2. The second blank period BR2 may be a period in which the vertical synchronization signal Vsync is not transmitted.

A third frame F3 may proceed after the second frame F2. The third frame F3 may operate at the first driving frequency. The third frame F3 may include a third valid period AR3 and a third blank period BR3.

The third valid period AR3 may proceed after the second blank period BR2. The third valid period AR3 may operate at the first frequency. The third valid period AR3 may be a period in which the vertical synchronization signal Vsync is transmitted.

The third blank period BR3 may proceed after the third valid period AR3. The third blank period BR3 may be a period in which the vertical synchronization signal Vsync is not transmitted.

A fourth frame F4 may proceed after the third frame F3. The driving frequency of the display layer 100 may be changed from the fourth frame F4. The fourth frame F4 may operate at a second driving frequency. The second driving frequency may be smaller than the first driving frequency. As an example, the second driving frequency may be about 72 Hz.

The controller 200C may include a counter that counts a clock of the vertical synchronization signal Vsync. The counter may calculate a cycle of the vertical synchronization signal Vsync based on the counted value. As an example, the first frequency may have 1080 clocks, and each of the first, second, and third frames F1, F2, and F3 may have 1125 clocks. The controller 200C may calculate that the first driving frequency is about 144 Hz based on 1125 clocks. The fourth frame F4 may have 2250 clocks. The controller 200C may calculate that the second driving frequency is about 72 Hz based on 2250 clocks. In addition, the controller 200C may calculate that the driving frequency of one frame is about 48 Hz when 3375 clocks are counted in the one frame. For example, the controller 200C may calculate the driving frequency of the display layer 100 based on the vertical synchronization signal Vsync.

The fourth frame F4 may include a fourth valid period AR4 and a fourth blank period BR4.

The fourth valid period AR4 may proceed after the third blank period BR3. The fourth valid period AR4 may operate at the first frequency. The fourth valid period AR4 may be a period in which the vertical synchronization signal Vsync is transmitted.

The fourth blank period BR4 may proceed after the fourth valid period AR4. The fourth blank period BR4 may be a period in which the vertical synchronization signal Vsync is not transmitted.

A fifth frame F5 may proceed after the fourth frame F4. The fifth frame F5 may operate at the second driving frequency. The fifth frame F5 may include a fifth valid period ARS and the fifth blank period BR5.

The fifth valid period ARS may proceed after the fourth blank period BR4. The fifth valid period ARS may operate at the first frequency. The fifth valid period ARS may be a period in which the vertical synchronization signal Vsync is transmitted.

The fifth blank period BR5 may proceed after the fifth valid period ARS. The fifth blank period BR5 may be a period in which the vertical synchronization signal Vsync is not transmitted.

A sixth frame F6 may proceed after the fifth frame F5. The sixth frame F6 may operate at the second driving frequency. The sixth frame F6 may include a sixth valid period AR6 and a sixth blank period BR6.

The sixth valid period AR6 may proceed after the fifth blank period BR5. The sixth valid period AR6 may operate at the first frequency. The sixth valid period AR6 may be a period in which the vertical synchronization signal Vsync is transmitted.

The sixth blank period BR6 may proceed after the sixth valid period AR6. The sixth blank period BR6 may be a period in which the vertical synchronization signal Vsync is not transmitted.

The sensing timing TT shows report intervals RR1 and RR2 in which sensing zones SS and SSa including the first touch signal TS are provided along the time axis. The sensor layer 200 may sense the touch by the user's body 2000 (refer to FIG. 1) based on the first touch signal TS. The report intervals RR1 and RR2 may refer to a frequency corresponding to a time duration of one cycle in which the first touch signal TS is transmitted to all the first lines SL1_1 to SL1_m in the sensor layer 200.

Each of the sensing zones SS and SSa may be operated in a self-touch method and/or a mutual touch method.

The self-touch method may mean a method that senses touch coordinates based on an amount of charge within a capacitor using the first lines SL1_1 to SL1_m and the second lines SL2_1 to SL2_n through which the first touch signal TS is transmitted.

The mutual touch method may mean a method that senses the touch coordinates based on a difference in charge amount between the first lines SL1_1 to SL1_m through which the first touch signal TS is transmitted and the second lines SL2_1 to SL2_n through which the second touch signal RS is transmitted.

The report intervals RR1 and RR2 may include a first report interval RR1 and a second report interval RR2. The first report interval RR1 and the second report interval RR2 may have different cycles from each other.

The first report interval RR1 may include one sensing zone SS. The sensing zone SS may include one first touch signal TS.

As an example, the sensing zone SS may have a cycle of about 2.4 ms (millisecond).

The controller 200C may change the cycle of the report intervals RR1 and RR2 based on the driving frequency.

When the third frame F3 is transitioned to the fourth frame F4, the driving frequency of the display layer 100 may be changed. As an example, the driving frequency of the display layer 100 may be changed from about 144 Hz to about 72 Hz.

The controller 200C may obtain the cycle of the vertical synchronization signal Vsync based on the value counted by the counter. The controller 200C may calculate the driving frequency based on the cycle of the vertical synchronization signal Vsync. As an example, the controller 200C may count the vertical synchronization signal Vsync of the fourth frame F4 and may calculate the second driving frequency of the fourth frame F4 after the fifth frame F5 starts. When it is determined that the driving frequency is changed from the first driving frequency to the second driving frequency, the controller 200C may change the cycle of the report interval. For example, the controller 200C may change the first report interval RR1 to the second report interval RR2 in the sensing timing TT overlapping the fifth frame F5 after calculating the driving frequency of the fourth frame F4.

The controller 200C may provide a plurality of sensing zones including the touch signal TS to the second report interval RR2. The controller 200C may further transmit an additional sensing zone SSa including the first touch signal TS in the second report interval RR2. The second report interval RR2 may include the sensing zones SS and SSa. The first touch signal TS may be provided for longer in the second report interval RR2 than in first report interval RR1.

The first report interval RR1 may be driven in synchronization with the first driving frequency. The second report interval RR2 may be driven in synchronization with the second driving frequency.

A first second report interval RR2 may include a first period A1a and a second period A2a. The first period A1a may overlap the fifth valid period AR5. The second period A2a may overlap the fifth blank period BR5. The first period A1a and the second period A2a may be arranged consecutively.

The sensing zones SS and SSa may be provided in the first second report interval RR2. The sensing zones SS and SSa may be disposed in the second period A2a. For example, the first touch signals TS may be provided in the second period A2a.

The additional sensing zone SSa may have the same cycle as the sensing zone SS. As an example, the additional sensing zone SSa may have the cycle of about 2.4 ms. However, this is merely an example, and the cycle of the additional sensing zone SSa should not necessarily be limited thereto or thereby. As an example, the additional sensing zone SSa may have a cycle of about 1.2 ms.

The controller 200C may move the sensing zone SS and the additional sensing zone SSa, each of which includes the first touch signal TS, to the second period A2a in the first second report interval RR2. The sensing zone SS and the additional sensing zone SSa may overlap the fifth blank period BR5.

According to the present disclosure, the number of times in which the first touch signal TS is applied to the electrodes 210 and 220 in the sensor layer 200 in one frame may increase by the additional sensing zone SSa, and thus, the number of times in which the touch is sensed in the second report interval RR2 may increase. Accordingly, an actual frequency at which the sensor layer 200 senses the touch may increase, and an accuracy of the touch coordinates calculated by the sensor layer 200 may be increased. Thus, a touch reliability of the electronic device 1000 (refer to FIG. 1) may be increased.

In addition, according to the present disclosure, the sensing zone SS and the additional sensing zone SSa may be disposed in the second period A2a overlapping the fifth blank period BR5. A first noise generated in the sensor layer 200 when the image IM (refer to FIG. 1) is displayed through the display layer 100 during the fifth valid period AR5 may be prevented from affecting the first touch signal TS of each of the sensing zone SS and the additional sensing zone SSa. In addition, a second noise generated in the display layer 100 when the touch coordinates are obtained in the sensing zone SS and the additional sensing zone SSa may be prevented from affecting signals of each of the data lines DL1 to DLm and the scan lines SL1 to SLn. Accordingly, a deterioration in a display quality and a touch quality of the electronic device 1000 (refer to FIG. 1) may be prevented.

A second second report interval RR2 may include a first period A1b and a second period A2b. The first period A1b may overlap the sixth valid period AR6. The second period A2b may overlap the fifth blank period BR5. The second period A2b and the first period A1b may be arranged consecutively.

The sensing zones SS and SSa may be provided in the second second report interval RR2. The sensing zones SS and SSa may be disposed in the second period A2b. For example, the first touch signals TS may be provided in the second period A2b.

The controller 200C may move the sensing zone SS and the additional sensing zone SSa, each of which includes the first touch signal TS, to the second period A2b in the second second report interval RR2. The sensing zone SS and the additional sensing zone SSa may overlap the fifth blank period BR5.

According to the present disclosure, the sensing zone SS and the additional sensing zone SSa may be disposed in the second period A2b overlapping the fifth blank period BR5. The first noise generated in the sensor layer 200 when the image IM (refer to FIG. 1) is displayed through the display layer 100 during the sixth valid period AR6 may be prevented from affecting the first touch signal TS of each of the sensing zone SS and the additional sensing zone SSa. In addition, the second noise generated in the display layer 100 when the touch coordinates are obtained in the sensing zone SS and the additional sensing zone SSa may be prevented from affecting the signals of each of the data lines DL1 to DLm and the scan lines SL1 to SLn. Accordingly, the deterioration in the display quality and the touch quality of the electronic device 1000 (refer to FIG. 1) may be prevented.

One sensing zone SS may be provided in a third second report interval RR2. The third second report interval RR2 may overlap the sixth valid period AR6.

The sensing zones SS and SSa may be provided in a fourth second report interval RR2. The fourth second report interval RR2 may overlap the sixth blank period BR6.

A second weight value of the second touch signal RS obtained in a period overlapping the sixth blank period BR6 may be greater than a first weight value of the second touch signal RS obtained in a period overlapping the sixth valid period AR6. For example, in the report interval, the second weight value of the second touch signal RS obtained from the second period overlapping the blank period may be greater than the first weight value of the second touch signal RS obtained from the first period overlapping the valid period.

The controller 200C may calculate the touch coordinates based on the second touch signal RS, the first weight value, and the second weight value. The controller 200C may calculate the touch coordinates by weighting the second touch signal RS sensed in the zone overlapping the blank period rather than the second touch signal RS sensed in the zone overlapping the valid period of the report interval.

Different from the present disclosure, the second touch signal RS measured in the sensing zone SS of the third second report interval RR2 may overlap the sixth valid period AR6 and may be influenced by the first noise generated in the sensor layer when the image IM (refer to FIG. 1) is displayed during the sixth valid period AR6. However, according to the present disclosure, the controller 200C may calculate the touch coordinates by weighting the second touch signal RS measured in the sensing zones SS and SSa of the fourth second report interval RR2 rather than the second touch signal RS measured in the sensing zone SS of the third second report interval RR2. The second touch signal RS measured in the sensing zones SS and SSa of the fourth second report interval RR2 may overlap the sixth blank period BR6 and may prevent the first noise from affecting the first touch signal TS of each of the sensing zone SS and the additional sensing zone SSa. The accuracy of the touch coordinates calculated by the sensor layer 200 may be increased. Accordingly, the touch reliability of the electronic device 1000 (refer to FIG. 1) may be increased.

Figure 11A:
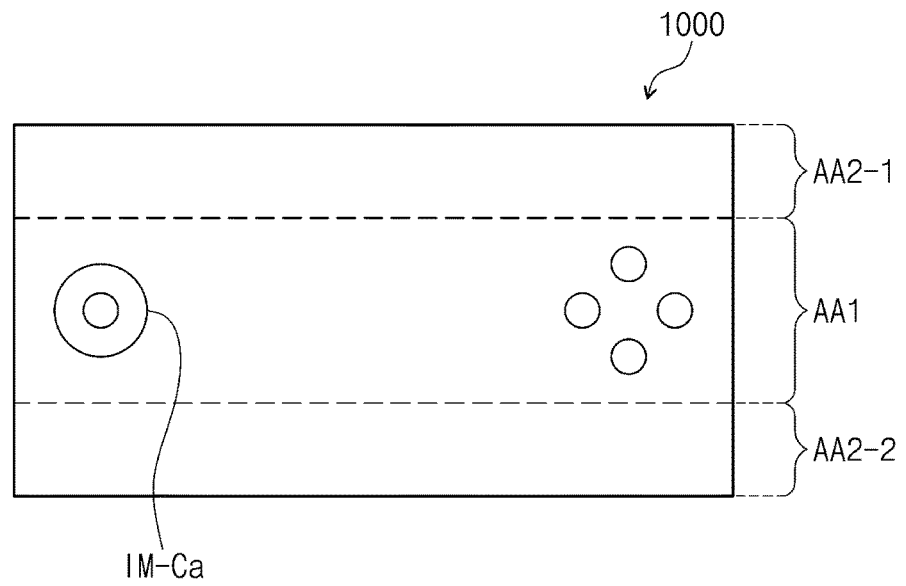
FIGS. 11A and 11B are plan views of electronic devices according to embodiments of the present disclosure.
Figure 11B:
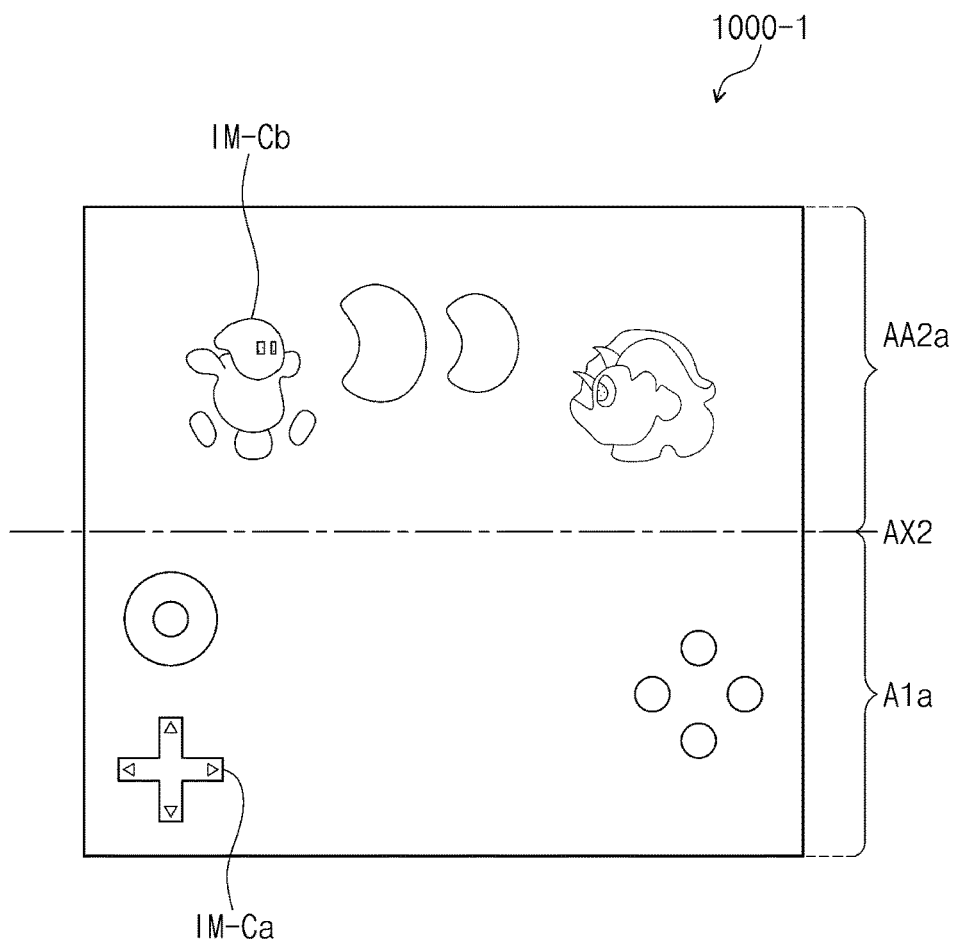
Figure 12A:
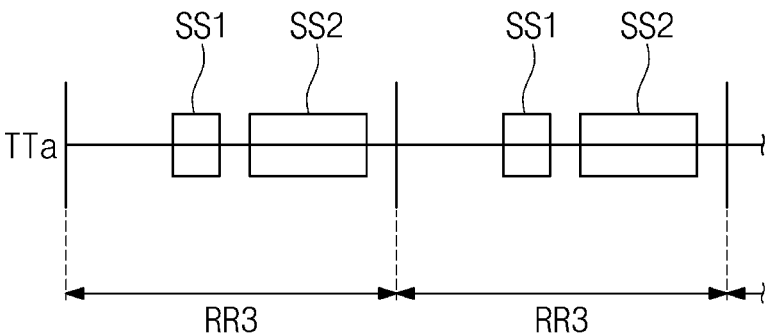
FIGS. 12A and 12B are timing diagrams showing a drive of an electronic device according to an embodiment of the present disclosure.
Figure 12B:
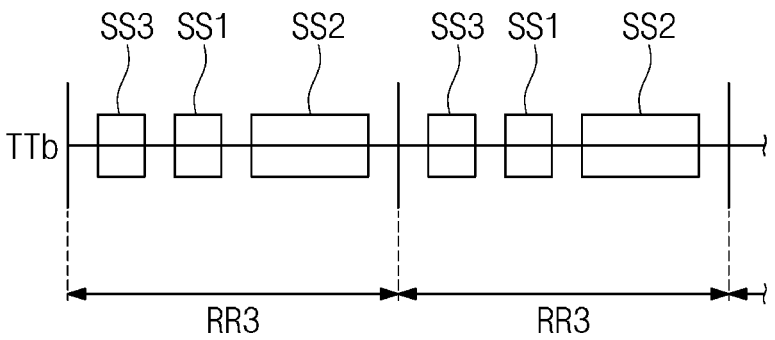

FIGS. 11A and 11B are plan views of electronic devices 1000 and 1000-1 according to embodiments of the present disclosure, and FIGS. 12A and 12B are timing diagrams showing a drive of an electronic device according to an embodiment of the present disclosure.

The electronic device 1000 shown in FIG. 11A corresponds to an embodiment of the electronic device 1000 shown in FIG. 1.

Referring to FIGS. 8, 11A, 12A, and 12B, an image of a game controller may be displayed as an image IM-C.

The display layer 100 (refer to FIG. 7) may include a first display area in which the image IM-C is displayed and second display areas defined adjacent to the first display area. The sensor layer 200 may include a first area AA1 overlapping the first display area and second areas AA2-1 and AA2-2 respectively overlapping the second display areas.

A first sensing timing TTa shows a report interval RR3 in which a sensing zone SS (refer to FIG. 10) including the first touch signal TS is provided along a time axis. The first sensing timing TTa shows the report interval RR3 corresponding to the second areas AA2-1 and AA2-2.

The sensing zone SS (refer to FIG. 10) may include a first sensing zone SS1 and a second sensing zone SS2 in the first sensing timing TTa.

The first sensing zone SS1 may be operated in a self-touch method. The second sensing zone SS2 may be operated in a mutual touch method. A first cycle of the first sensing zone
SS1 may be smaller than a second cycle of the second
sensing zone SS2. As an example, the first cycle of the first
sensing zone SS1 may be about 1.2 ms. The second cycle of
the second sensing zone SS2 may be about 2.4 ms. However,
this is merely an example, and the operation method of each
of the first sensing zone SS1 and the second sensing zone
SS2 should not necessarily be limited thereto or thereby.

A second sensing timing TTb shows a report interval RR3
in which a sensing zone SS (refer to FIG. 10) including the
first touch signal TS is provided along the time axis. The
second sensing timing TTb shows the report interval RR3
corresponding to the first area AA1.

The first sensing timing TTa and the second sensing
timing TTb may be timing diagrams having different touch
sensing areas from each other but the same time axis.

The sensing zone SS (refer to FIG. 10) may include a first
sensing zone SS1, a second sensing zone SS2, and a third
sensing zone SS3. Each of the first sensing zone SS1, the
second sensing zone SS2, and the third sensing zone SS3
may include the first touch signal TS.

The third sensing zone SS3 may be operated in the mutual
touch method. A third cycle of the third sensing zone SS3
may be smaller than the second cycle of the second sensing
zone SS2. As an example, the second cycle of the second
sensing zone SS2 may be about 2.4 ms, and the third cycle
of the third sensing zone SS3 may be about 1.2 ms.

According to an embodiment, the accuracy of the touch
coordinates may be increased due to the first, second, and
third sensing zones SS1, SS2, and SS3 using both the
self-touch method and the mutual touch method. Accord-
ingly, the touch reliability of the electronic device 1000
(refer to FIG. 1) may be increased.

As the third sensing zone SS3 is further provided, the first
touch signal TS may be provided for longer in the first area
AA1 than in the second areas AA2-1 and AA2-2.

The number of times in which the first touch signal TS is
provided to the electrodes 210 and 220 in the sensor layer
200 in one report interval RR3 may increase due to the
added third sensing area SS3, and thus, the number of times
in which the touch is sensed in the report interval RR3 of the
first area AA1 may increase. Accordingly, a first sensing
frequency at which the sensor layer 200 senses the touch in
the first area AA1 may increase. A second sensing frequency
at which the sensor layer 200 senses the touch in the report
interval RR3 of the second areas AA2-1 and AA2-2 may be
smaller than the first sensing frequency.

For example, the first sensing frequency of the report
interval RR3 of the first sensing timing TTa, which is
provided to the second display area, may be greater than the
second sensing frequency of the report interval RR3 of the
second sensing timing TTb, which is provided to the first
display area.

The first sensing frequency of the report interval RR3 of
the first sensing timing TTa, which is provided to the second
display areas AA2-1 and AA2-2, may be calculated based on
the input of the first touch signal TS, which is provided to the
second sensing zone SS2 of the report interval RR3, per
time. As an example, the first sensing frequency may be
about 188 Hz, and the cycle may be about 5.3 ms.

The second sensing frequency of the report interval RR3
of the second sensing timing TTb, which is provided to the
first area AA1, may be calculated based on the input of the
first touch signals TS, which are provided to the second
sensing zone SS2 and the third sensing zone SS3 of the report interval RR3, per time. As an example, the second
sensing frequency may be about 377 Hz, and the cycle may
be about 2.60 ms.

According to the present disclosure, as the sensing fre-
quency increases, a speed in sensing the touch input to the
sensor layer 200 may become faster, and a sensitivity in
sensing the touch in the first area AA1 may be increased. In
addition, the touch sensitivity with respect to an area that
requires a sensitive touch detection, for example, the area
where a controller for games is displayed, may be increased.
Accordingly, the touch reliability of the electronic device
1000 (refer to FIG. 1) may be increased.

In addition, according to the present disclosure, the num-
ber of times in which the first touch signal TS is provided to
the electrodes 210 and 220 in one report interval RR3 of the
first area AA1 may increase. As the sensing frequency in the
first area AA1 increases, the accuracy of the touch coordi-
nates calculated by the sensor layer 200 may be increased.
Accordingly, the touch reliability of the electronic device
1000 (refer to FIG. 1) may be increased.

The electronic device 1000-1 shown in FIG. 11B corre-
sponds to an embodiment of the electronic device 1000*b*
shown in FIGS. 3A to 3D.

Referring to FIGS. 11B, 12A, and 12B, the image IM
(refer to FIG. 1) may include a first image IM-Ca and a
second image IM-Cb.

The first image IM-Ca may include an image to control
the second image IM-Cb. The second image IM-Cb may
include more dynamic image than the first image IM-Ca. As
an example, the first image IM-Ca may be a game controller,
and the second image IM-Cb may be a game screen. The
second image IM-Cb may be displayed as the game screen
based on an input overlapping the game controller.

The display layer 100 (refer to FIG. 7) may include a first
display area in which the first image IM-Ca is displayed and
a second display area in which the second image IM-Cb is
displayed. The first display area may overlap the first
non-folding area NFA3 (refer to FIG. 3B). The second
display area may overlap the second non-folding area NFA4
(refer to FIG. 3B).

The sensor layer 200 may include a first area AA1a
overlapping the first display area and a second area AA2a
overlapping the second display area.

The first sensing timing TTa shows the report interval
RR3 corresponding to the second area AA2a. In the first
sensing timing TTa, the report interval RR3 may include the
first sensing zone SS1 and the second sensing zone SS2.

The second sensing timing TTb shows the report interval
RR3 corresponding to the first area AA1a. In the second
sensing timing TTb, the report interval RR3 may further
include the third sensing zone SS3 when compared with the
report interval RR3 in the first sensing timing TTa. The
report interval RR3 in the second sensing timing TTb may
include the first sensing zone SS1, the second sensing zone
SS2, and the third sensing zone SS3.

As the third sensing zone SS3 is additionally provided, the
first touch signal TS may be provided more in the first area
AA1a than in the second area AA2a.

The number of times in which the first touch signal TS is
provided to the electrodes 210 and 220 in the sensor layer
200 of one report interval RR3 may increase by the addi-
tionally provided third sensing area SS3, and the number of
times in which the touch is sensed in the report interval RR3
of the first area AA1a may increase. Accordingly, the first
sensing frequency at which the touch is sensed by the sensor
layer 200 in the first area AA1a may increase. The second
sensing frequency at which the touch is sensed by the sensor layer 200 in the report interval RR3 of the second area AA2a may be smaller than the first sensing frequency.

The first sensing frequency of the report interval RR3 of the first sensing timing TTa, which is provided to the second area AA2a, may be calculated based on the input of the first touch signal TS, which is provided to the second sensing zone SS2 of the report interval RR3, per time. The second sensing frequency of the report interval RR3 of the second sensing timing TTb, which is provided to the first area AA1a, may be calculated based on the input of the first touch signals TS, which is provided to the second sensing zone SS2 and the third sensing zone SS3 of the report interval RR3, per time.

According to the present disclosure, as the sensing frequency increases, the speed in sensing the touch input to the sensor layer 200 may become faster. The touch sensitivity of the touch in the first area AA1a may be increased. The touch sensitivity with respect to an area that requires a sensitive touch detection, for example, the area where a controller for games is displayed, may be increased. Accordingly, the touch reliability of the electronic device 1000 (refer to FIG. 1) may be increased.

In addition, according to the present disclosure, the number of times in which the first touch signal TS is applied to the electrodes 210 and 220 in one report interval RR3 of the first area AA1 may increase. As the sensing frequency in the first area AA1 increases, the accuracy of the touch coordinates calculated by the sensor layer 200 may be increased. Accordingly, the touch reliability of the electronic device 1000 (refer to FIG. 1) may be increased.

Figure 13:
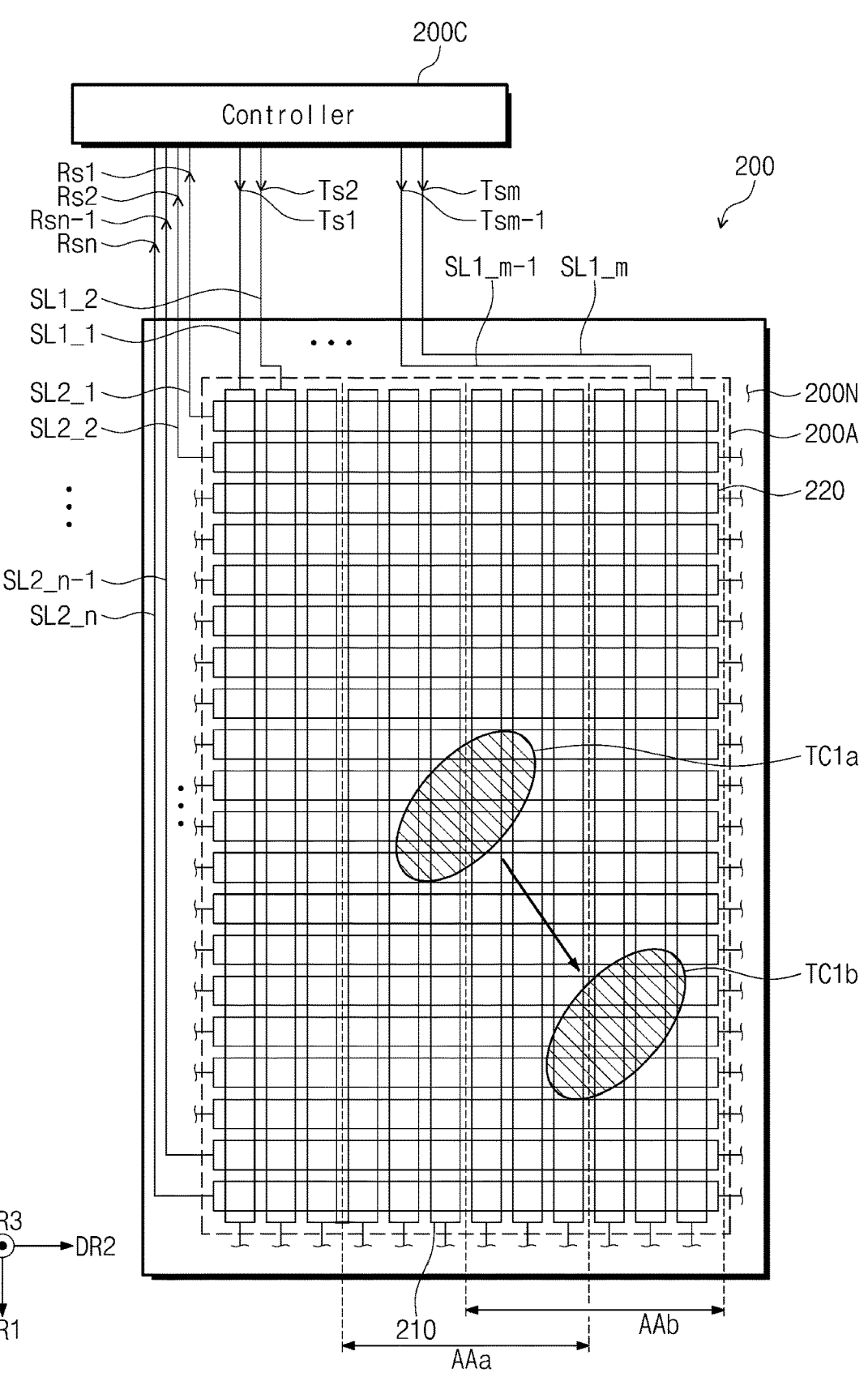
FIG. 13 is a plan view of a sensor layer according to an embodiment of the present disclosure.

FIG. 13 is a plan view of the sensor layer 200 according to an embodiment of the present disclosure. In FIG. 13, the same reference numerals may denote the same elements in FIG. 9, and thus, to the extent that an element is not described herein, it may be understood to be at least similar to a corresponding element described elsewhere within the present disclosure.

Referring to FIGS. 8, 12A, 12B, and 13, the sensor layer 200 may sense inputs TC1a and TC1b applied thereto.

The sensor layer 200 may include a first sensing area AAa that overlaps a first input TC1a and a second sensing area that does not overlap the first input TC1a.

The user's body 2000 (refer to FIG. 1) may continuously move from the first input TC1a to a second input TC1b along an upper surface of the sensor layer 200.

The sensor layer 200 may include a first sensing area AAb that overlaps the second input TC1b and a second sensing area that does not overlap the second input TC1b.

The first sensing areas AAa and AAb may be continuously changed in response to the movement of the first inputs TC1a and TC1b. For example, as the input is continuously applied from the first input TC1a to the second input TC1b, the first sensing areas AAa and AAb and the second sensing area may also be continuously changed in response to the input. The controller 200C may further provide the first touch signal TS to the first sensing areas AAa and AAb in response to the change of the first sensing areas AAa and AAb.

The first sensing timing TTa shows the report interval RR3 corresponding to the second sensing area. In the first sensing timing TTa, the report interval RR3 may include the first sensing zone SS1 and the second sensing zone SS2.

The second sensing timing TTb shows the report interval RR3 corresponding to the first sensing areas AAa and AAb. In the second sensing timing TTb, the report interval RR3 may further include the third sensing zone SS3 when compared with the report interval RR3 in the first sensing timing TTa.

As the third sensing zone SS3 is additionally provided, the first touch signal TS may be provided more in the first sensing areas AAa and AAb than in the second sensing area.

The number of times in which the first touch signal TS is provided to the electrodes 210 and 220 in the sensor layer 200 of one report interval RR3 may increase by the additionally provided third sensing area SS3, and the number of times in which the touch is sensed in the report interval RR3 of the first sensing areas AAa and AAb may increase. Accordingly, the first sensing frequency at which the touch is sensed by the sensor layer 200 in the first sensing areas AAa and AAb may increase. The second sensing frequency at which the touch is sensed by the sensor layer 200 in the report interval RR3 of the second sensing area may be smaller than the first sensing frequency.

According to the present disclosure, as the sensing frequency increases, the speed in sensing the touch input to the sensor layer 200 may become faster. The touch sensitivity of the first inputs TC1a and TC1b in the first sensing areas AAa and AAb that are continuously changed may be increased while the first sensing areas AAa and AAb are tracked. In addition, since the sensing frequency in the first sensing areas AAa and AAb increases, the accuracy of the touch coordinates calculated by the sensor layer 200 may be increased. Accordingly, the touch reliability of the electronic device 1000 (refer to FIG. 1) may be increased.

Figure 14:
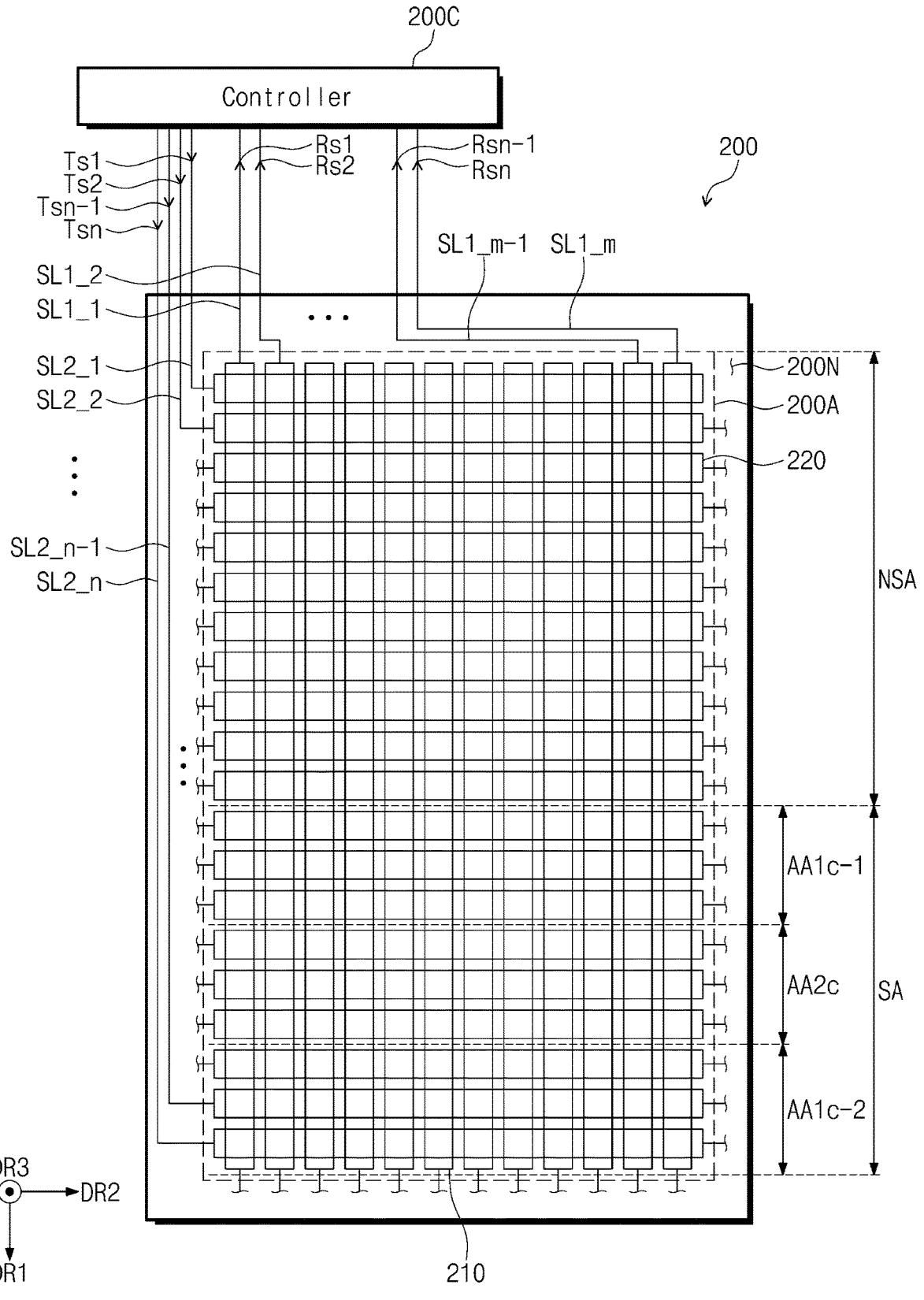
FIG. 14 is a plan view of a sensor layer according to an embodiment of the present disclosure.

FIG. 14 is a plan view of the sensor layer 200 according to an embodiment of the present disclosure. In FIG. 14, the same reference numerals may denote the same elements in FIG. 9, and thus, to the extent that an element is not described herein, it may be understood to be at least similar to a corresponding element described elsewhere within the present disclosure.

Referring to FIGS. 8, 12A, 12B, and 14, the display layer 100 (refer to FIG. 7) may include a first area that is flexible and a second area defined adjacent to the first area. The first area may have a shape changed by a folding, bending, or sliding operation.

In a case where the image IM (refer to FIG. 1) is displayed in the first area and the second area, the first driving and sensing circuit 200C2 may transmit the first touch signal TS to the first electrodes 210, and the second driving and sensing circuit 200C3 may receive the second touch signal RS from the second electrodes 220.

In a case where the shape of the first area is changed, the image IM (refer to FIG. 1) might not be displayed in the first area. In this case, the first area may be referred to as a non-display area, and the second area may be referred to as a display area.

A non-sensing area NSA overlapping the first area and a sensing area SA overlapping the second area may be defined in the sensor layer 200.

In a case where the image IM (refer to FIG. 1) is displayed only in the second area, the second driving and sensing circuit 200C3 may transmit the first touch signal TS to the second electrodes 220, and the first driving and sensing circuit 200C2 may receive the second touch signal RS from the first electrodes 210.

In addition, in the case where the image IM (refer to FIG. 1) is displayed only in the second area, the sensor control circuit 200C1 may switch the first driving and sensing circuit 200C2 and the second driving and sensing circuit 200C3 to each other. Accordingly, the first driving and sensing circuit 200C2 may transmit the first touch signal TS to the second electrodes 220, and the second driving and sensing circuit 200C3 may receive the second touch signal RS from the first electrodes 210.

The sensing area SA may include first sensing areas AA1c-1 and AA1c-2 and a second sensing area AA2c. FIG. 14 shows two first sensing areas and one second sensing area as a representative example, however, the number of the first and second sensing areas should not necessarily be limited thereto or thereby.

The controller 200C may further apply the first touch signal TC to the first sensing areas AA1c-1 and AA1c-2.

The first sensing timing TTa shows the report interval RR3 corresponding to the second sensing area AA2c. In the first sensing timing TTa, the report interval RR3 may include the first sensing zone SS1 and the second sensing zone SS2.

The second sensing timing TTb shows the report interval RR3 corresponding to each of the first sensing areas AA1c-1 and AA1c-2. In the second sensing timing TTb, the report interval RR3 may further include the third sensing zone SS3 when compared with the report interval RR3 in the first sensing timing TTa.

As the third sensing zone SS3 is additionally provided, the first touch signal TS may be provided more in the first sensing areas AA1c-1 and AA1c-2 than in the second sensing area AA2c.

The number of times in which the first touch signal TS is applied to the electrodes 210 and 220 in the sensor layer 200 of one report interval RR3 may increase by the additionally provided third sensing area SS3, and the number of times in which the touch is sensed in the report interval RR3 of the first sensing areas AA1c-1 and AA1c-2 may increase. Accordingly, the first sensing frequency at which the touch is sensed by the sensor layer 200 in the first sensing areas AA1c-1 and AA1c-2 may increase. The second sensing frequency at which the touch is sensed by the sensor layer 200 in the report interval RR3 of the second sensing area AA2c may be smaller than the first sensing frequency.

According to the present disclosure, as the sensing frequency increases, the speed in sensing the touch input to the sensor layer 200 may become faster. The touch sensitivity of the touch in the first sensing areas AA1c-1 and AA1c-2 may be increased. The touch sensitivity with respect to an area that requires a sensitive touch detection, for example, the area where a controller for games is displayed, may be increased. In addition, since the sensing frequency in the first sensing areas AA1c-1 and AA1c-2 increases, the accuracy of the touch coordinates calculated by the sensor layer 200 may be increased. Accordingly, the touch reliability of the electronic device 1000 (refer to FIG. 1) may be increased.

Although the embodiments of the present disclosure have been described, it is understood that the present disclosure should not necessarily be limited to these embodiments but various changes and modifications can be made by one ordinary skilled in the art within the spirit and scope of the present disclosure.

What is claimed is:

1. An electronic device, comprising:

a display layer driven at a driving frequency comprising a first driving frequency and a second driving frequency that is smaller than the first driving frequency, the display layer configured to display an image in a unit of a frame;

a sensor layer disposed on the display layer, the sensor layer driven in a unit of a report interval in which a first touch signal is provided, the sensor layer comprising a plurality of first electrodes each extending in a first direction and receiving the first touch signal and a plurality of second electrodes each extending in a second direction crossing the first direction and transmitting a second touch signal;

a display driver configured to generate a vertical synchronization signal and configured to control the display layer; and a controller configured to control the sensor layer, wherein the frame comprises a valid period in which the vertical synchronization signal is transmitted and a blank period in which the vertical synchronization signal is not transmitted, wherein the controller is configured to calculate the driving frequency of the display layer based on the vertical synchronization signal and to change a cycle of the report interval based on the driving frequency, and wherein the controller is configured to provide a plurality of the first touch signals during the report interval when the driving frequency is changed from the first driving frequency to the second driving frequency.

2. The electronic device of claim 1, wherein the report interval comprises a first period overlapping the valid period and a second period overlapping the blank period, and the first touch signals are provided in the second period.

3. The electronic device of claim 1, wherein the report interval comprises a first period overlapping the valid period and a second period overlapping the blank period, wherein a second weight value of the second touch signal obtained in the second period is greater than a first weight value of the second touch signal obtained in the first period, and wherein the controller is configured to calculate touch coordinates based on the second touch signal, the first weight value, and the second weight value.

4. The electronic device of claim 1, wherein the report interval comprises a first period overlapping the valid period and a second period overlapping the blank period, and the controller is configured to move the first touch signal to the second period in the report interval.

5. The electronic device of claim 1, wherein the image comprises a first image and a second image different from the first image, the display layer comprises a first display area in which the first image is displayed and a second display area in which the second image is displayed, the sensor layer comprises a first area overlapping the first display area and a second area overlapping the second display area, and the first touch signal is provided for a longer period of time to the first area than to the second area.

6. The electronic device of claim 5, wherein the first image controls the second image, and the second image is displayed based on a first input that is externally provided.

7. The electronic device of claim 5, wherein a first sensing frequency of the report interval of the first display area is greater than a second sensing frequency of the report interval of the second display area.

8. The electronic device of claim 1, wherein the sensor layer is configured to sense a first input applied thereto, the sensor layer comprises a first sensing area that overlaps the first input and a second sensing area that does not overlap the first input, and the first touch signal is provided for a longer period of time to the first sensing area than to the second sensing area.

9. The electronic device of claim 8, wherein the first sensing area is continuously changed in response to a movement of the first input, and the controller provides the first touch signal in response to the change of the first sensing area.

10. The electronic device of claim 1, wherein the display layer comprises a first area in which the image is not displayed and a second area adjacent to the first area, and when the image is displayed only in the second area, the controller transmits the first touch signal to the second electrodes and receives the second touch signal from the first electrodes.

11. An electronic device, comprising:

a display layer configured to display an image in a unit of a frame, the display layer driven at a first driving frequency in a first display area and a second driving frequency in a second display area adjacent to the first display area;

a sensor layer disposed on the display layer, comprising a first area overlapping the first display area and a second area overlapping the second display area, and driven in a unit of a report interval; and a controller configured to transmit a first touch signal to the sensor layer and receive a second touch signal different from the first touch signal from the sensor layer, wherein the controller is configured to set a cycle of the first touch signal in the first area based on the first driving frequency and set a cycle of the first touch signal in the second area based on the second driving frequency, and wherein the first touch signal is provided for a longer period of time to the first area than to the second area when the first driving frequency is lower than the second driving frequency.

12. The electronic device of claim 11, wherein a second sensing frequency of the report interval provided to the second display area is smaller than a first sensing frequency of the report interval provided to the first display area.

13. The electronic device of claim 11, wherein the image comprises a first image and a second image that is more dynamic than the first image, the first image is displayed in the first display area, and the second image is displayed in the second display area.

14. The electronic device of claim 11, wherein the sensor layer senses a first input applied thereto, the first area overlaps the first input, the second area does not overlap the first input, and the first area is continuously changed in response to a movement of the first input.

15. The electronic device of claim 11, wherein the sensor layer comprises a plurality of first electrodes and a plurality of second electrodes electrically insulated from the first electrodes while crossing the first electrodes, the controller is configured to transmit the first touch signal to the first electrodes and receive the second touch signal from the second electrodes when the image is displayed in the first and second display areas, and the controller is configured to transmit the first touch signal to the second electrodes and receive the second touch signal from the first electrodes when the image is displayed only in the second display area.

16. The electronic device of claim 15, wherein the display layer is folded with respect to a folding axis extending in a first direction, the first electrodes extend in a second direction crossing the first direction and are spaced apart from each other in the first direction, and the second electrodes extend in the first direction and are spaced apart from each other in the second direction.

17. The electronic device of claim 11, wherein the first and second driving frequencies are reduced, the frame comprises a valid period and a blank period provided consecutively to the valid period, and the controller provides a plurality of the first touch signals during a period overlapping the blank period of the report interval when the first and second driving frequencies are reduced.

18. The electronic device of claim 17, wherein a second weight value of the second touch signal obtained in the period overlapping the blank period is greater than a first weight value of the second touch signal obtained in a period overlapping the valid period, and the controller is configured to calculate touch coordinates based on the second touch signal, the first weight value, and the second weight value.

19. The electronic device of claim 17, wherein the controller moves the first touch signal from a first period overlapping the valid period to a second period overlapping the blank period in the report interval.

20. An electronic device, comprising:

a display layer driven at a driving frequency comprising a first driving frequency and a second driving frequency that is smaller than the first driving frequency, displaying an image in a unit of frame, and comprising a first display area and a second display area adjacent to the first display area;

a sensor layer disposed on the display layer, driven in a unit of a report interval in which a first touch signal is provided, comprising a plurality of first electrodes receiving the first touch signal and a plurality of second electrodes transmitting a second touch signal, the sensor layer comprising a first sensing area corresponding to the first display area and a second sensing area corresponding to the second display area; and a controller configured to control the sensor layer, wherein the frame comprises a valid period in which a vertical synchronization signal is transmitted and a blank period in which the vertical synchronization signal is not transmitted, wherein the controller is configured to calculate the driving frequency of the display layer based on the vertical synchronization signal and change the report interval based on the driving frequency, and wherein the controller is configured to provide a plurality of the first touch signals during the report interval when the driving frequency is changed and provide the first touch signal closer to the first sensing area than to the second sensing area.

* * * * *